United States Patent [19]

Miyake et al.

[11] Patent Number: 5,640,232
[45] Date of Patent: Jun. 17, 1997

[54] IMAGE FORMING APPARATUS AND METHOD OF CHANGING CONTROL OF SORTER WHEN THE BIN IS FULLY LOADED IN ACCORDANCE WITH THE MODE

[75] Inventors: Norifumi Miyake, Tokyo; Akiyoshi Kimura, Kawasaki; Yoshiyuki Suzuki, Yokohama; Tadashi Suzuki, Tokyo; Shinichi Nakamura, Kawasaki; Yoshihiko Suzuki, Tokyo; Minoru Nada, Kawasaki; Satoru Kutsuwada, Yokohama; Kenji Kobayashi, Tokyo; Satoshi Kaneko; Shokyo Koh, both of Kawasaki; Hirohiko Tashiro, Yokohama, all of Japan

[73] Assignee: Canon Kabushiki Kaisha, Tokyo, Japan

[21] Appl. No.: 676,897

[22] Filed: Jul. 8, 1996

Related U.S. Application Data

[63] Continuation of Ser. No. 498,915, Jul. 6, 1995, abandoned.

[30] Foreign Application Priority Data

Jul. 6, 1994  [JP]  Japan ................................. 6-154670

[51] Int. Cl.⁶ .................................................. G03G 21/00
[52] U.S. Cl. ............................... 399/18; 399/82; 399/107
[58] Field of Search ............................. 355/204, 208, 355/209, 308, 309, 313, 316, 321, 323; 358/296, 300, 498; 271/3.17, 278, 279

[56] References Cited

U.S. PATENT DOCUMENTS

| 4,200,386 | 4/1980 | Queener ................................ 355/323 |
| 4,522,486 | 6/1985 | Clark et al. ........................... 355/323 |
| 5,166,739 | 11/1992 | Katsuki et al. .................... 355/309 X |
| 5,202,738 | 4/1993 | Braswell et al. .................... 355/323 |
| 5,204,728 | 4/1993 | Braswell et al. .................... 355/323 |

FOREIGN PATENT DOCUMENTS

| 59-7380 | 1/1984 | Japan ..................................... 355/323 |
| 59-77457 | 5/1984 | Japan ..................................... 355/323 |

*Primary Examiner*—Sandra L. Brase
*Attorney, Agent, or Firm*—Fitzpatrick, Cella, Harper & Scinto

[57] ABSTRACT

An image forming apparatus performs the printing in any of a copy mode, a facsimile mode and a print mode, having a sorter for sorting ejected sheets, wherein the operation is controlled suitably for each mode when the number of sheets stored in a bin of said sorter is over the upper limit. An image forming method using a plurality of bins, and a counter for counting the number of sheets stored in each bin, includes interrupting the print if the number of sheets stored in the bin is over the upper limit in the copy mode, and continuing the print and switching the bin, in the printer and facsimile mode, if the number of sheets is over the upper limit.

42 Claims, 25 Drawing Sheets

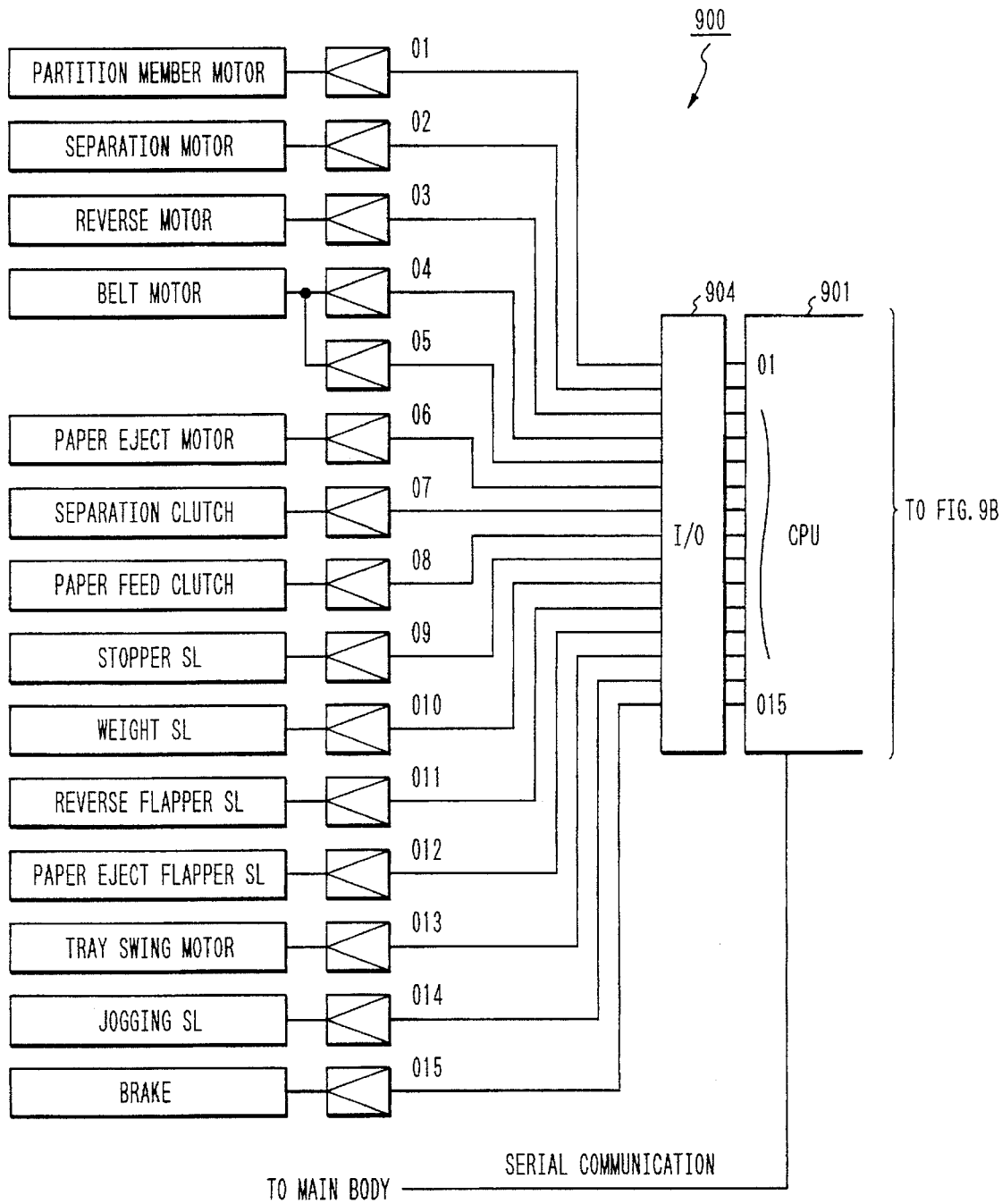

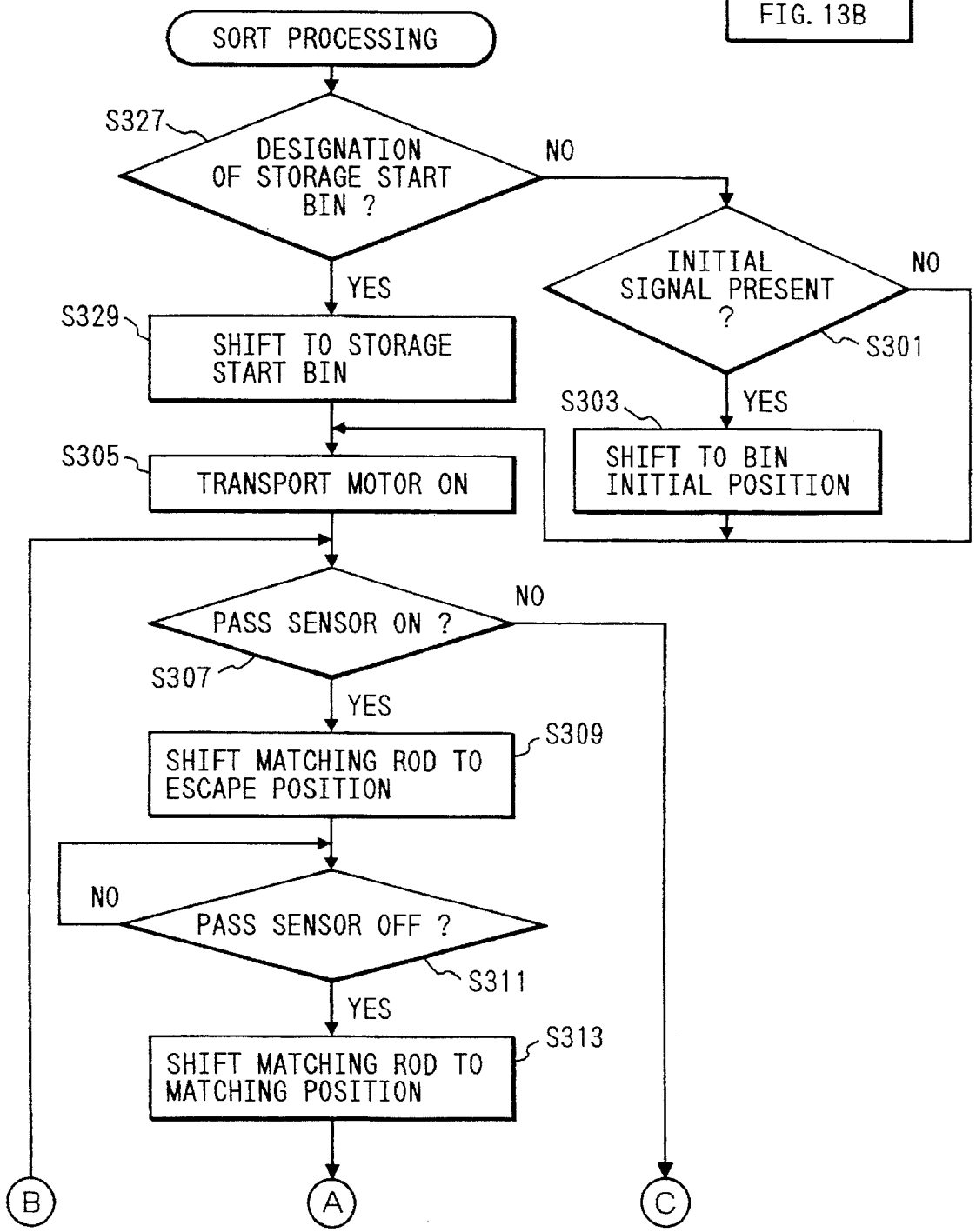

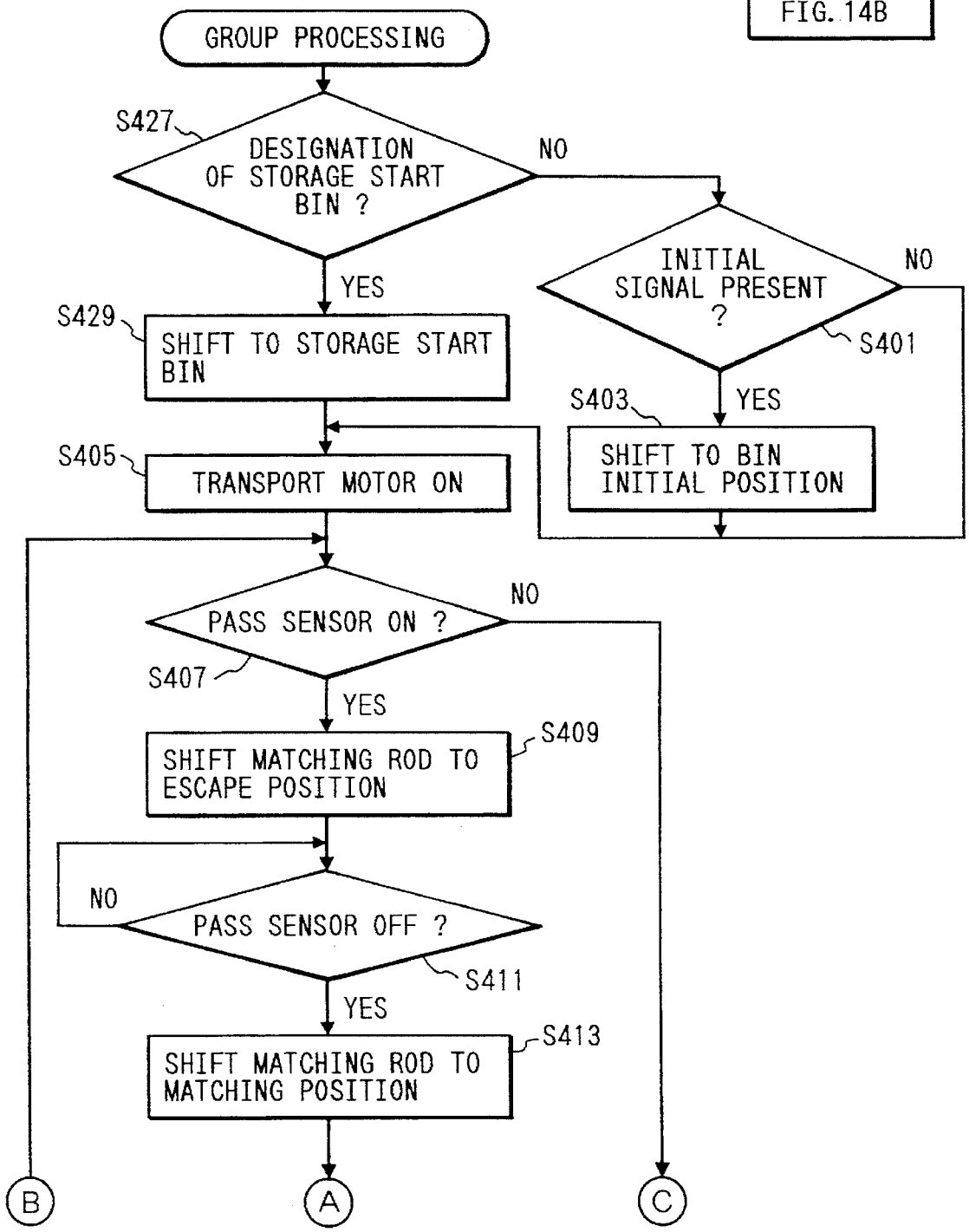

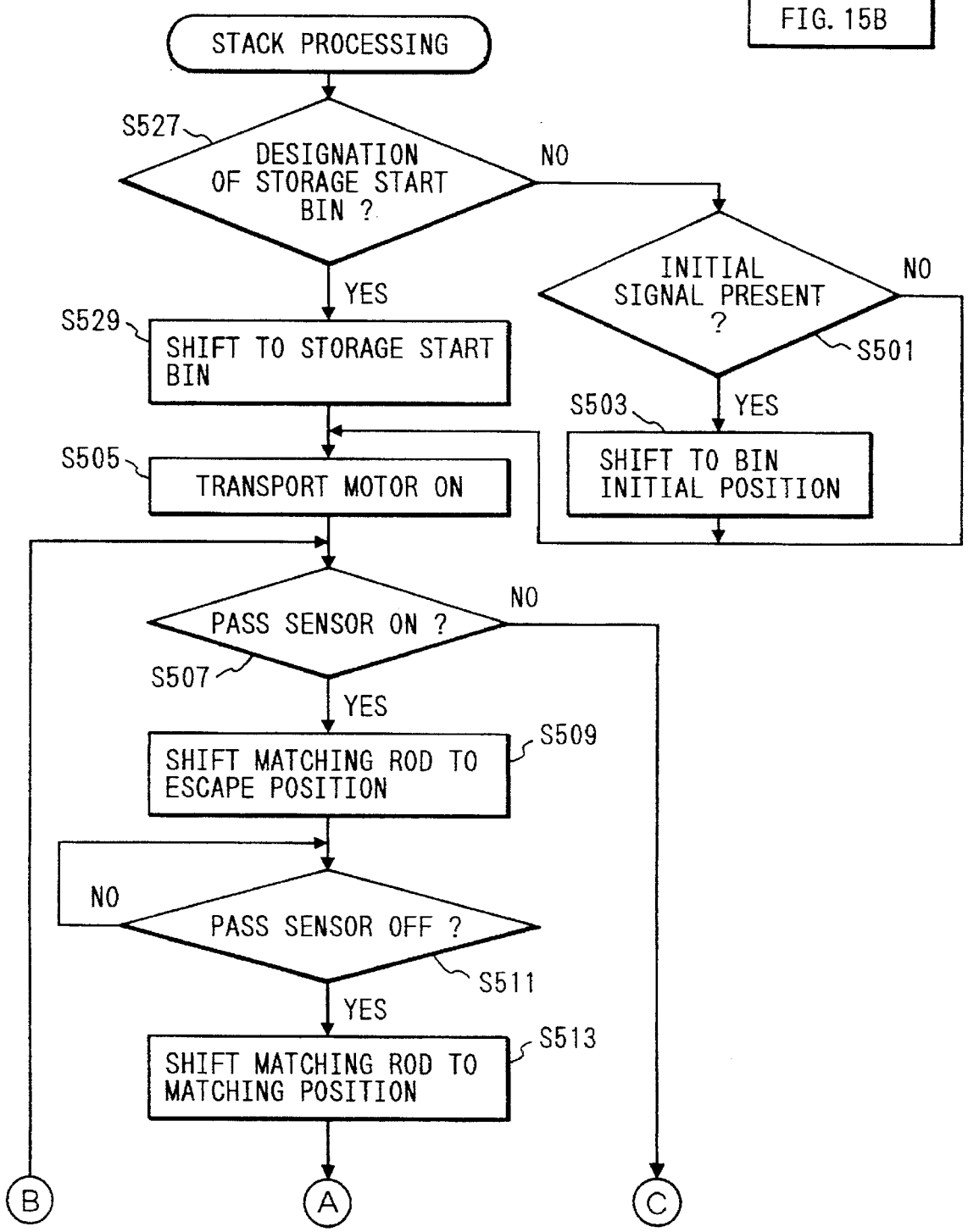

IMAGE FORMING APPARATUS AND METHOD OF CHANGING CONTROL OF SORTER WHEN THE BIN IS FULLY LOADED IN ACCORDANCE WITH THE MODE

This application is a continuation of application No. 08/498,915, filed Jul. 6, 1995, now abandoned.

BACKGROUND OF THE INVENTION

1. Field of the Invention

The present invention relates to an image forming apparatus and method for forming an image in accordance with any of a plurality of modes.

2. Related Background Art

Recently, the copying machines having facsimile and printer functions have been manufactured. It is currently common practice to connect a sorter with a copying machine, wherein the sorter can be also connected to the above-mentioned copying machine having multiple functions. In the conventional copying machine, if the sorter bin becomes full during copying, the copying operation is interrupted and controlled to display a message prompting the operator to remove the sheets from the bin. In such copying operation, it is more suitable to remove the sheet and restart after interruption due to the bin being full because the operator can classify properly the sheets which have been sorted.

If the copying machine having a plurality of functions is controlled conventionally when the bin is full as above described, the receiving/recording operation in a facsimile mode, or the recording operation in a printer mode may be inconsistent, because the operator does not often reside beside the copying machine as the recording is started from an external apparatus. Thus, if the recording operation is interrupted, all the images cannot be printed, and especially in the facsimile mode, the operator at the receiving side does not know when the receiving/recording occurs creating a high possibility that the reception results incompletely.

SUMMARY OF THE INVENTION

It is an object of the present invention to provide an image forming apparatus and method wherein the aforementioned problem has been solved.

Also, it is another object of the invention to provide an image forming apparatus and method for changing control of a sorter when the bin is full in accordance with the mode.

Other objects and features of the present invention will be more apparent from the following description and the accompanying drawings.

DETAILED DESCRIPTION OF THE PREFERRED EMBODIMENTS

The present invention will be described below in detail based on a plurality of examples.

[Example 1]

Figure 1:
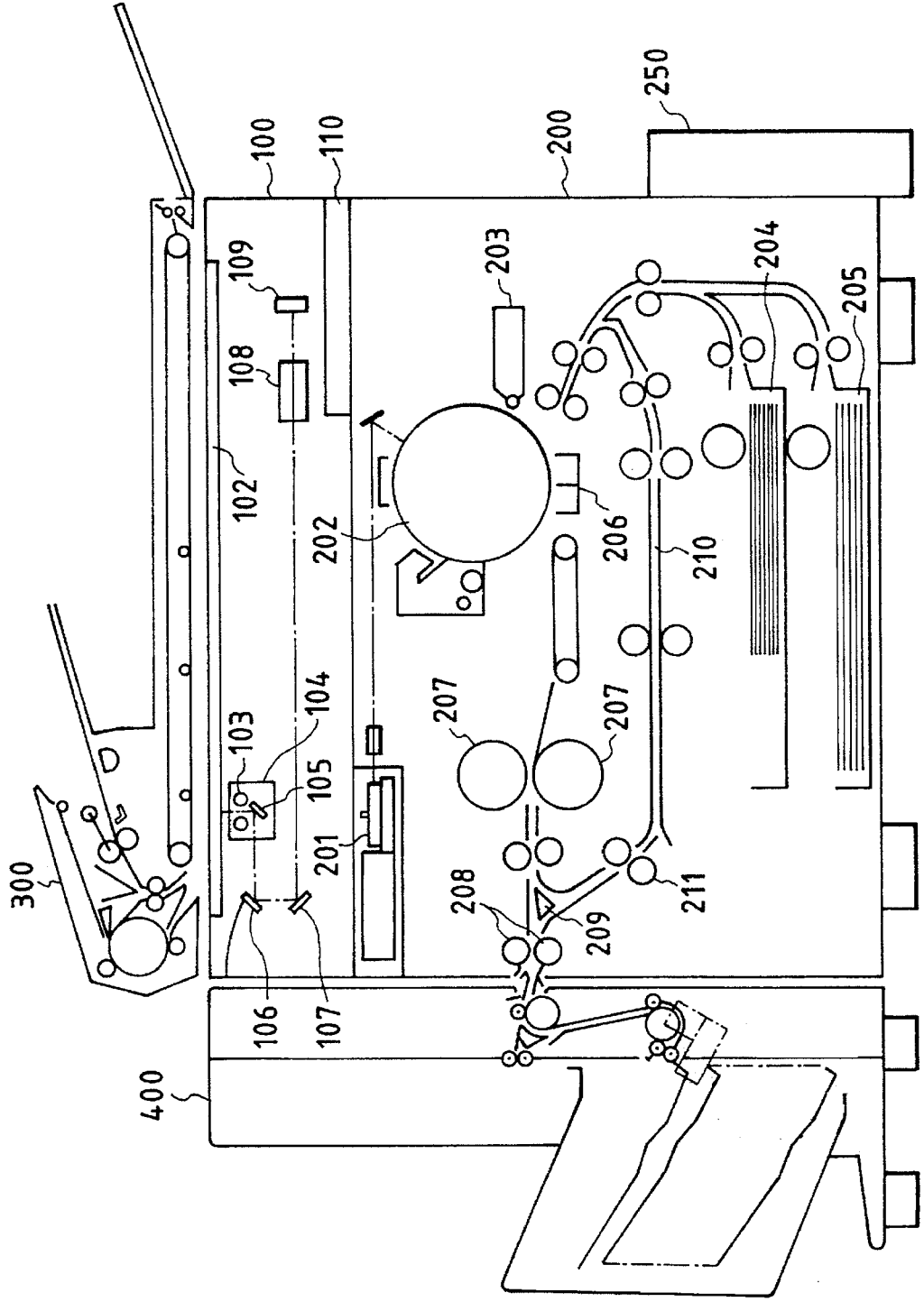
FIG. 1 is an overall configurational cross-sectional view of one example.

FIG. 1 shows a cross-sectional view of the construction of an overall system in a first example of an image forming system according to the present invention. In FIG. 1, 100 is a reader unit of main body, 200 is a printer unit, 300 is a cyclic automatic original feeder (RDF) as original delivery unit (DH), and 400 is a sheet postprocessor (sorter). Also, 110 indicates an image processing unit.

A. Main Body (Reader Unit 100 and Printer Unit 200)

In FIG. 1, 100 is an image input device (hereinafter referred to as a "reader unit") for converting an original into image data, 200 is an image output device (hereinafter referred to as a "printer unit") having a plurality of types of recording sheet cassettes, and outputting image data as a visible image onto a recording paper upon receiving a print instruction, and 250 is an external apparatus electrically connected to the reader unit 100. This external apparatus 250, which has a variety of functions, comprises a FAX unit, a file unit, an external storage device connected to the file unit, a computer interface unit for connecting to a computer, a formatter unit for formatting the information from the computer into visible image, an image memory unit for storing the information from the reader unit or temporarily storing the information sent from the computer, and a core unit for controlling each of the above functions (not shown).

Referring now to FIG. 1, the construction and operation of the reader unit 100 and the printer unit 200 will be described.

Originals laid on the RDF 300 are transported in sequence one at a time onto a platen glass plane 102 (its operation will be described later). If an original is transported to a predetermined position on the platen glass plane 102, a lamp 103 on a scanner unit is lighted, and the scanner unit 104 is moved to illuminate the original. Reflected light from the original is passed via the mirrors 105, 106, 107 and a lens 108 into a CCD image sensor 109. And in the CCD image sensor 109 which is illuminated by reflected light from the original, the electrical processing such as the photoelectric conversion is effected to make normal digital processing. Thereafter, the signals are input into the printer unit 200.

An image signal entered into the printer unit 200 is converted into an optical signal modulated by an exposure control unit 201, which signal is applied to a photosensitive body (drum) 202. A latent image made on the photosensitive body 202 by illuminating light is developed by a developing unit 203. A transfer paper (sheet) is transported from a transfer paper tray 204 or 205, timed by the top end of the developed image, which is then transferred in a transfer unit 206. The transferred image is fixed onto the transfer paper by a fixing unit 207, and then ejected out of the apparatus by a paper eject unit 208. The transfer papers outputted from the paper eject unit 208 are sorted by a sorter 400 in accordance with a preset operation mode and then bound.

Subsequently, a method for outputting sequentially read images onto both sides of one output paper will be described.

The output paper fixed by the fixing unit 207 is once transported to the paper eject unit 208 to reverse the transporting direction of the paper, and transported via a transporting direction switch member 209 to a transferred paper tray for resupply 210. If a next original is prepared, an original image is read through the same process as above described, but because the transfer paper is supplied from the transferred paper tray for resupply 210, it follows consequently that two original images are output on the front and back surfaces of the same output paper.

B. Cyclic Automatic Original Feeder (RDF) 300

Figure 2:
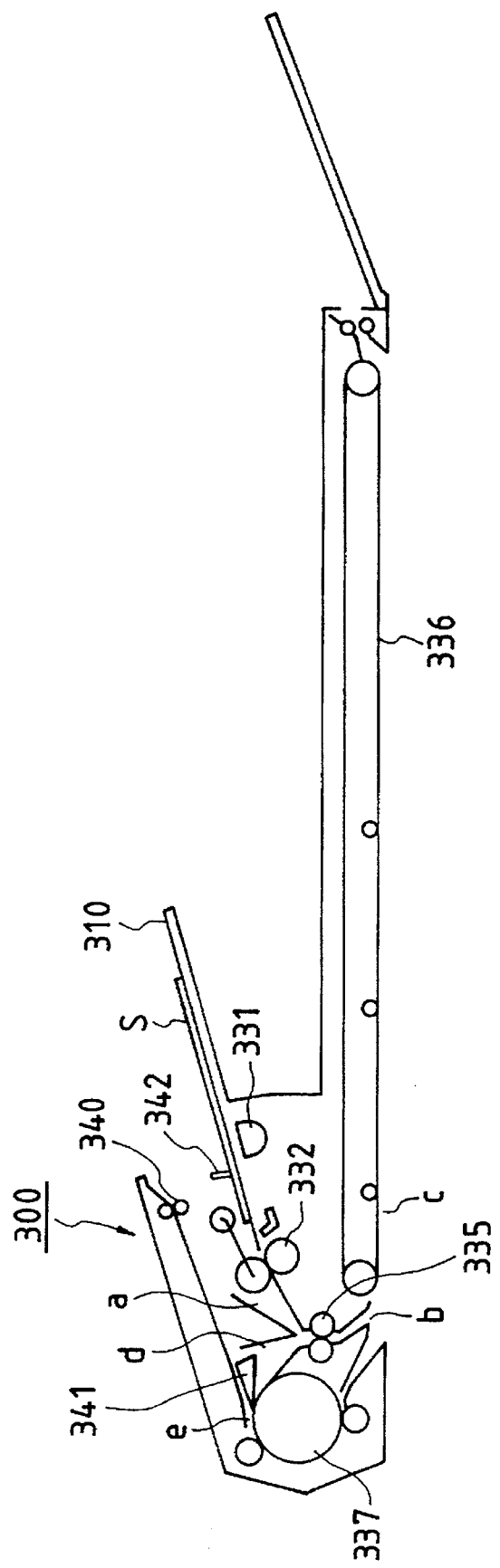
FIG. 2 is a configurational cross-sectional view of RDF in the example.

As the construction of an RDF is shown in cross section particularly in FIG. 2, RDF 300 is equipped with a load tray 310 as the first original tray to set an original bundle S. Also, the load tray 310 is equipped with supply means constituting one portion of original supply means. This supply means is comprised of a semilunar roller 331, a separation transport roller 332, a separation motor SPRMTR (not shown), a registration roller 335, a full-face belt 336, a belt motor BELTMTR (not shown), a transport large roller 337, a transport motor FEEDMTR (not shown), a paper eject roller 340, a flapper 341, a recycle lever 342, a paper supply sensor ENTS, a reverse sensor TRNS, and a paper eject sensor EJTS (not shown).

Herein, the semilunar roller 331 and the separation transport roller 332 are rotated by the separation motor SPRMTR to separate one original each time from the lowermost part of the original bundle S placed on the load tray 310.

Also, the registration roller 335 and the full-face belt 336 are rotated by the belt motor BELTMTR to transport the separated original via sheet paths a, b to an exposure position (sheet path c) on the original board glass 101. Also, the transport large roller 337 is rotated by the transport motor FEEDMTR to transport the original on the original board glass 101 from sheet path c to sheet path e. The original transported to this sheet path e is returned to the original bundle S on the load tray 310 by the paper eject roller 340.

Also, the recycle lever 342 detects one cycle of the original such that the recycle lever 342 is placed on top of the original bundle S upon the start of the supply of originals, originals are sequentially supplied, and when the trailing end of a final original goes through the recycle lever 342, the falling by its own weight is detected.

In the above supply means, when a duplex original is used, the original is led once from sheet paths a, b to sheet path c, then the transport large roller 337 is rotated to change the flapper 341 to lead the leading end of the original to a sheet path d, then the registration roller 335 is rotated to pass the original to the sheet path b, thereafter the original is transported on the original board glass 101 by means of the full-face belt 336 and stopped, thereby reversing the original. That is, the original is reversed through sheet paths c to d to b.

It is noted that originals of the original bundle S are passed one sheet after another through sheet paths a to b to c to d to e, and transported until one cycle of the original is detected by the recycle lever 342, thereby counting the number of originals.

C. Sheet Postprocessor (Sorter) 400

Figure 3:
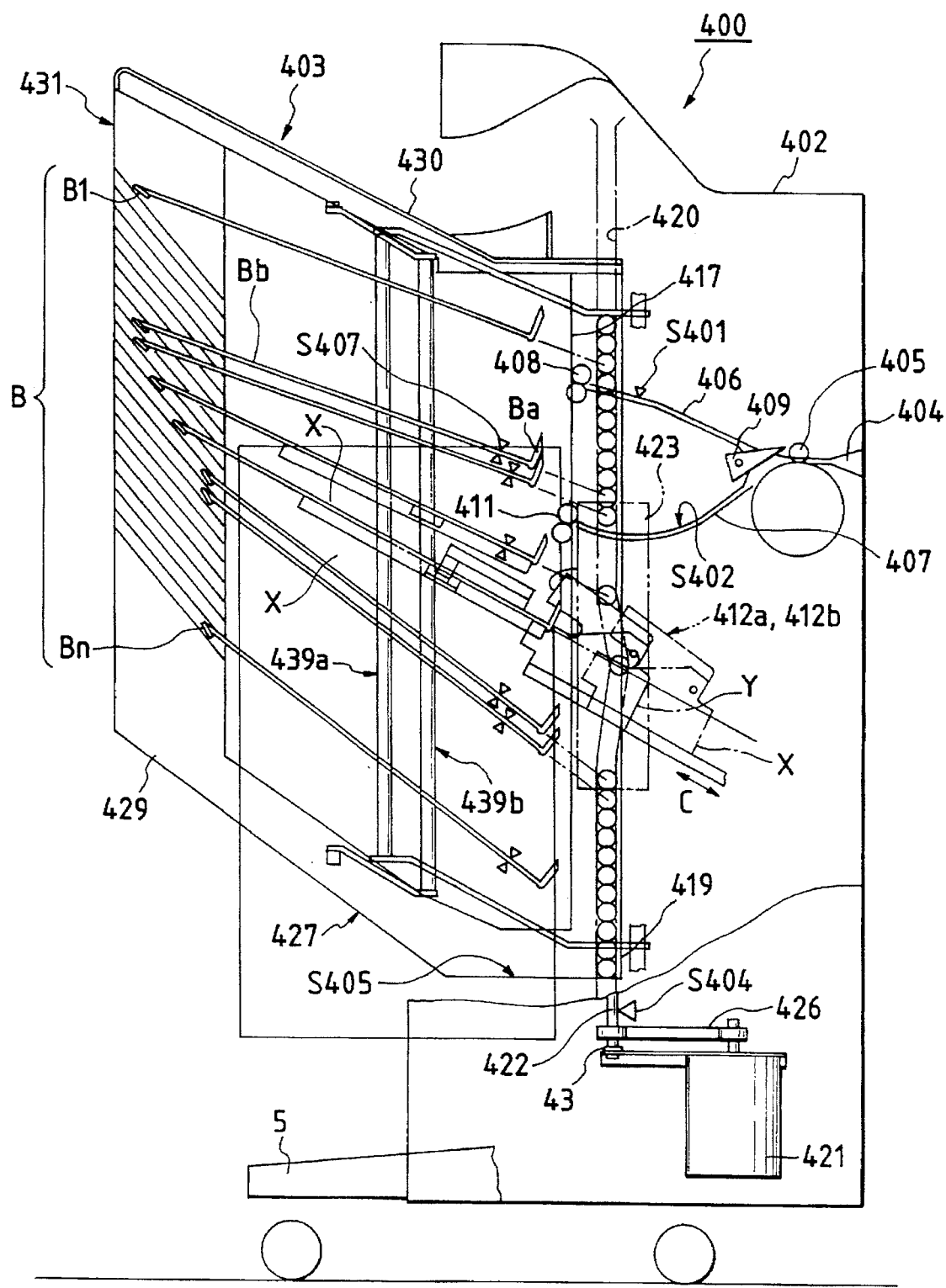
FIG. 3 is a configurational cross-sectional view of a sorter.
Figure 4:
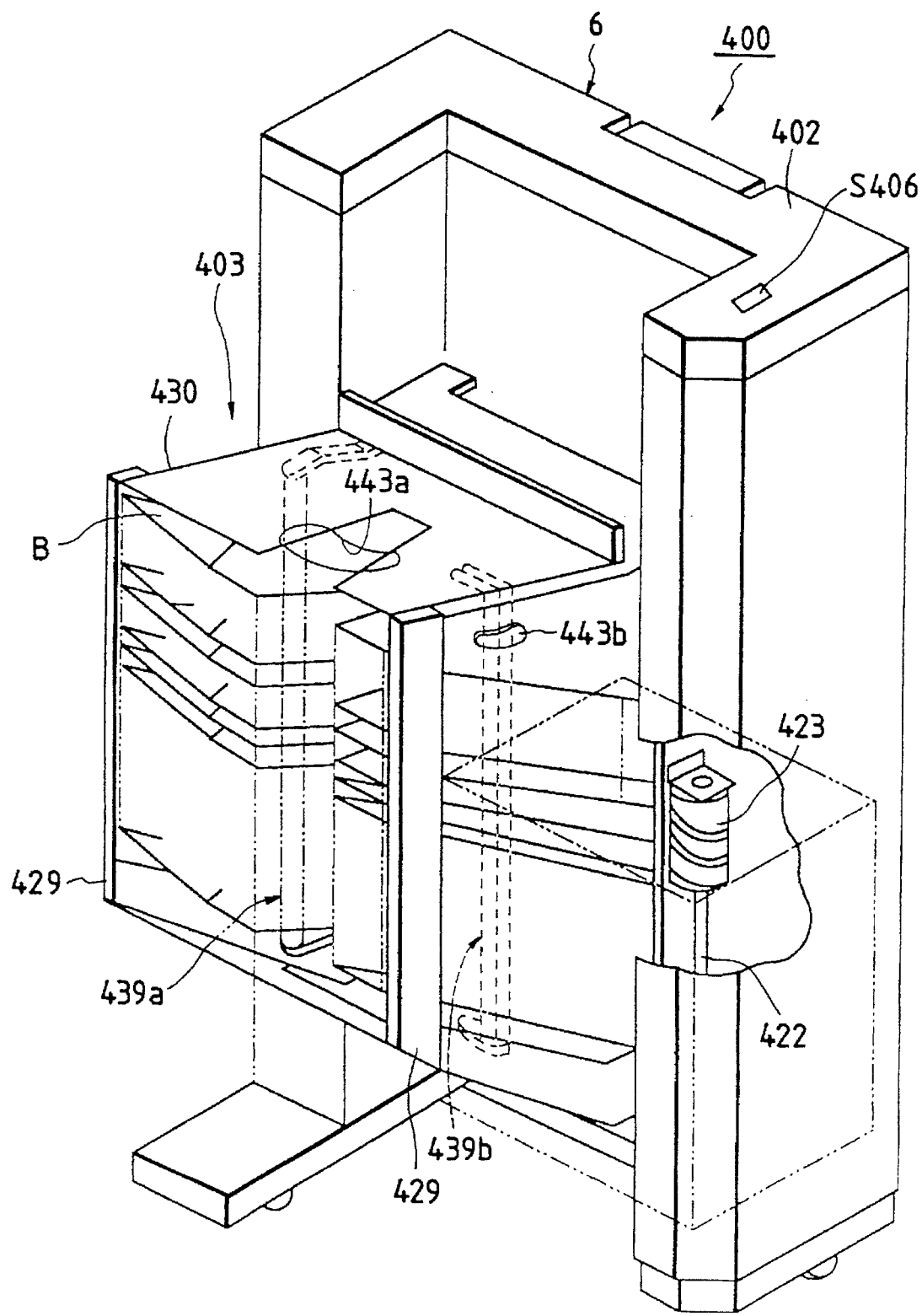
FIG. 4 is a configurational perspective view of the sorter.

Next, a sorter will be described with reference to FIGS. 3 and 4. FIGS. 3 and 4 are constitutional cross-sectional and perspective views of the sorter 400, respectively. In both views, the sorter 400 is comprised of a frame 402 and a bin unit 403, the frame 402 equipped with a pair of carrying rollers 405 near a carrying entrance 404. Downstream of the carrying roller pair 405 is disposed a flapper 409 for changing the sheet transport direction to either a transport path 406 or 407. And one transport path 406 extends substantially in a horizontal direction, with a pair of transport rollers 408 disposed downstream thereof, while the other transport path 407 extends downwards, with a pair of transport rollers 411 disposed downstream thereof, and further staplers 412a, 412b disposed at the positions close to this roller pair 411.

The carrying roller pair 405 and the transport roller pairs 408, 411 are driven by the transport motor 413 (not shown). A non-sort path sensor S401 is disposed in the above transport path 406, and a sort path sensor S402 is disposed in the transport path 407. Also, a bin unit 403 having a number of bins B is located downstream of the transport roller pairs 408 and 411, and supported liftably with its weight held by a spring having one end engaging a hook of this bin unit 403, and the other end secured to the frame 402.

At the upper and lower portions on the base end side of the bin unit 403, the guide rollers 417, 419 are supported rotatably, and configured to roll in a guide groove 420 extending vertically along the frame 402 for guiding the bin unit 403. Also, the frame 402 has a shift motor 421 disposed. A lead cam 423 is secured to a rotational shaft 422 fitted rotatably into the frame 402. A chain 426 is stretched around an output shaft of the shift motor 421, so that the rotation of the motor 421 is transmitted via the chain 426 to the rotational shaft 422.

Further, the bin unit 403 has a unit main body 431 comprised of a bottom frame 427 composed of an inclined portion and a vertical portion, frames 429 as a pair provided vertically on the top end fore side and rear side of the bottom frame 427, and a cover 430 supported by the frames 429. On the fore side of this unit main body 431, a reference plate for matching the sheet S by abutment is provided.

And on the base end rear side of the bottom frame 427, a lower arm which can rotate by a matching motor a (not shown) is supported rotatably. Further, at a position opposed to the lower arm a of the cover 430, an upper arm a is secured around a shaft a supported rotatably on the cover 430, the shaft a extending between the rotational center of this upper arm a and the rotational center of the lower arm. A matching rod 439a is provided between the top end of this lower arm a and the top end of this upper arm a, this matching rod 439a being rotated by a matching motor a for matching of the sheet (not shown) on the bin B with the fore side.

At the same time, on the base end fore side of the bottom frame 427, a lower arm b rotatable by a matching motor b (not shown) is supported rotatably. Further, at a position opposed to the lower arm b of the cover 430, an upper arm b is secured around a shaft b supported rotatably on the cover 430. A matching rod 439b is provided between the top end of this lower arm b and the top end of this upper arm b, this matching rod 439b being rotated by a matching motor b for the matching of the sheet (not shown) on the bin B at the rear side.

The matching motors a, b each are a stepping motor, in which the position of matching rods 439a, 439b can be accurately controlled in terms of the number of pulses applied to each stepping motor. Also, S403a, S403b, not shown, are matching rod home sensors for sensing the position of matching rod 439a, 439b, in which the position of matching rod 439a, 439b can be controlled by means of each matching rod home sensor and in terms of the number of pulses applied to each matching motor a, b.

The bin B is formed with engagement plates on the fore and rear sides at the top end, respectively, and supported at the top end side of this engagement plates engaging with support plates provided inside the frame 429. Further, the bin B is opened with a long hole 443a, a predetermined distance from the shaft a, which is longer than the rotational length of matching rod 439a and sufficiently wider than the width of matching rod 439a, and a long hole 443b, a predetermined distance from the shaft b, which is longer than the rotational length of matching rod 439b and sufficiently wider than the width of matching rod 439b (see FIG. 4). A base end portion Ba of the bin B rises vertically with respect to a sheet receiving plane Bb. The bin B is inclined at a certain angle with respect to the frame 402, the top end upward, and owing to this inclination, the sheet P slides down the sheet receiving plane Bb to cause its rear end to abut against the base end portion Ba, for matching of the sheet in the forward and backward directions (see FIG. 3).

Also, the bin B is provided with a notch where a stapler 412 enters to prevent the stapler 412 from interfering with the bin B. The matching rod 439a is fitted through the long hole 443a for bins B1, B2, . . . , Bn, this matching rod 439a being rotatable within the long hole 443a to match the sheet (not shown) on the bin B with the fore side. Likewise, the matching rod 439b is fitted through the long hole 443b of bins B1, B2, . . . , Bn, this matching rod 439b being rotated within the long hole 443b to match the sheet (not shown) on the bin B with the rear side.

Also, the lead cam 423 engages one part of the bin, the bin unit being moved up or down along the groove 423a by rotation of the lead cam 423. Note that one rotation of the lead cam 423 can be sensed by a lead cam sensor S404 disposed near the lead cam 423. Also, the position of the bin unit 403 is sensed by a bin home position sensor S405. The presence of a sheet or sheet bundle (not shown) on the sheet bin B can be sensed by a sheet tray paper detecting sensor (sheet postprocessing position selecting means).

Disposed near the paper eject roller pair 411 at the lower side is an electric stapler 412 for binding the sheets S stored within the bin B to be moved to or back from a position orthogonal to a carrying direction of the sheet (not shown), by driving means, wherein the stapler 412 is normally escaped to the position X not to interfere with the bin B moving up or down, but when the sheet or sheet bundle (not shown) on the bin B is bound, the stapler is moved to the position Y to bind the sheet or sheet bundle (not shown). After termination of binding, this electric stapler is returned to the position X by driving means, not shown.

Also, the electric stapler 412 performs the staple operation by the rotation of a motor, not shown, wherein when the sheets S on a plurality of bins B1, . . . , Bn are bound, the bin unit 403 is moved to a predetermined bin position to bind the sheet or sheet bundle (not shown) stored in the bin B, after termination of the staple operation for the sheet or sheet bundle (not shown) of one bin B.

Note that S406 in FIG. 4 is a manual staple key, wherein when the manual staple key S406 is depressed after end of sorting, the staple operation is performed.

By the rotational operation of the matching rod 439a on the rear side of the sorter 400, the position of the sheet bundle on the bin B can be pushed forward.

D. Operation Unit and Display Unit (500)

Figure 5:
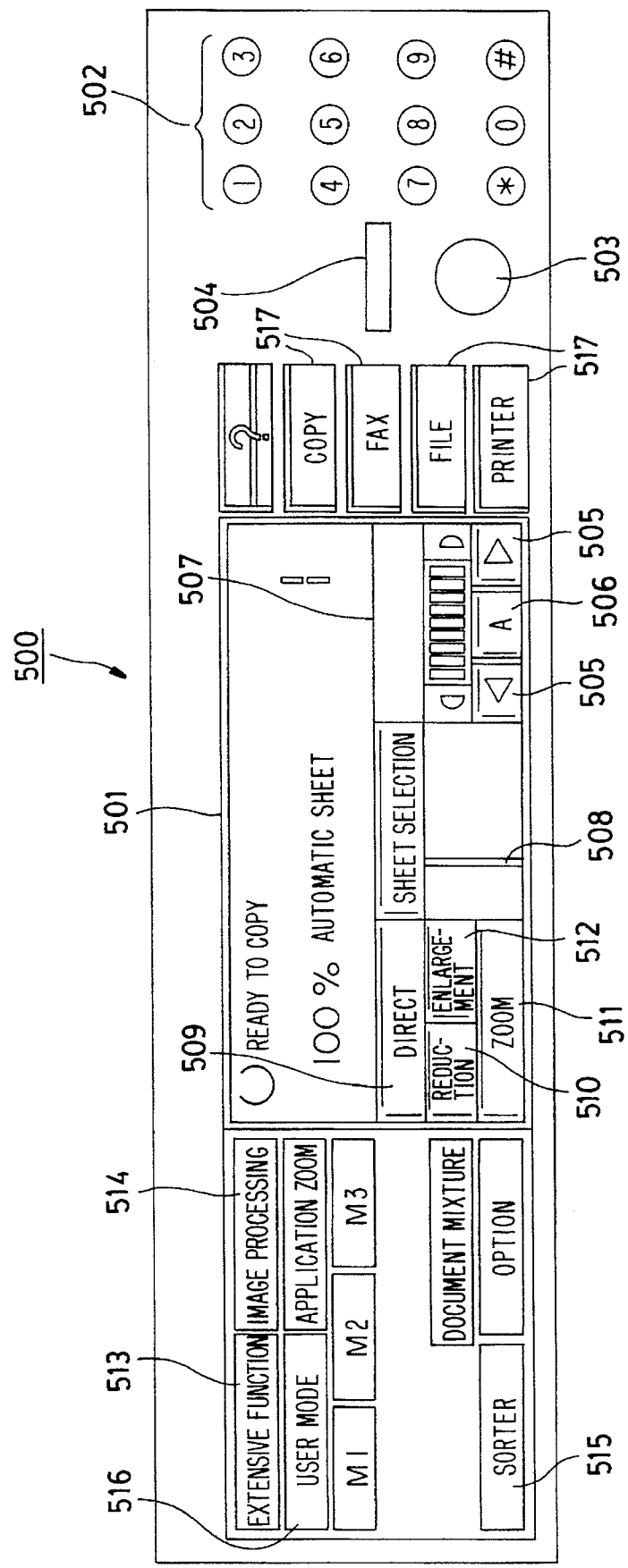
FIG. 5 is a front view of a configurational example of an operation/display panel.

FIG. 5 is a front view of a configurational example of the arrangement of an operation and display panel provided on the main body 100. This operation and display panel has keys 502, 503, 504 and an LCD display 501 capable of the key display.

503 is a copy start key, which is depressed when starting the copy in a copy mode. 504 is a clear/stop key, which has a function of clear key if depressed during the standby, or a function of stop key during copy recording. This clear key is depressed to release the set number of copies. 502 is a ten key which is depressed to set the number of copies. 505 is a copy density key, which is depressed to manually adjust the copy density. 506 is an AE key, which is depressed to adjust automatically the copy density in accordance with the density of original, or enable manually the density adjustment by releasing the AE (automatic density adjustment).

508 is a cassette selection key, which is depressed to select an upper stage cassette, an intermediate stage cassette, or a lower stage paper deck. Also, when some originals are laid on the RDF 300, APS (automatic paper selection) can be selected by using this key 508. When APS is selected, a cassette for transfer paper of the same size as the original is automatically selected. 509 is a direct magnification key, which is depressed to make the direct copy (of actual size). 511 is a zoom key, which is depressed to designate any magnification in a range from 64 to 142%. 510 and 512 each are a predefined magnification key, which is depressed to designate the reduction or enlargement of fixed size.

Also, 515 is a key for selecting the operation mode of sorter, which can select or release a paper eject method (staple, sort, group), a staple mode/sort mode when the stapler capable of binding recorded papers is connected, or the folding of recorded papers (Z shape in cross section/V shape in cross section).

Further, various settings for processing can be made by key 513, 514. For example, duplex face mode, binding margin setting, photographic mode, multiprocessing, page series copy, and 2 in 1 mode. 501 is an LCD display for displaying various messages, including information concerning the series copy. One can select a copy mode, a facsimile mode, a file mode, or a printer mode by touching a key displayed on the display 501. However, the facsimile mode or the printer mode can be automatically selected in accordance with a calling from the facsimile on the transmission side or an instruction from PC/WS (computer), so that the plotting of a received image is started.

(Overall Block Diagram)

Figure 6:
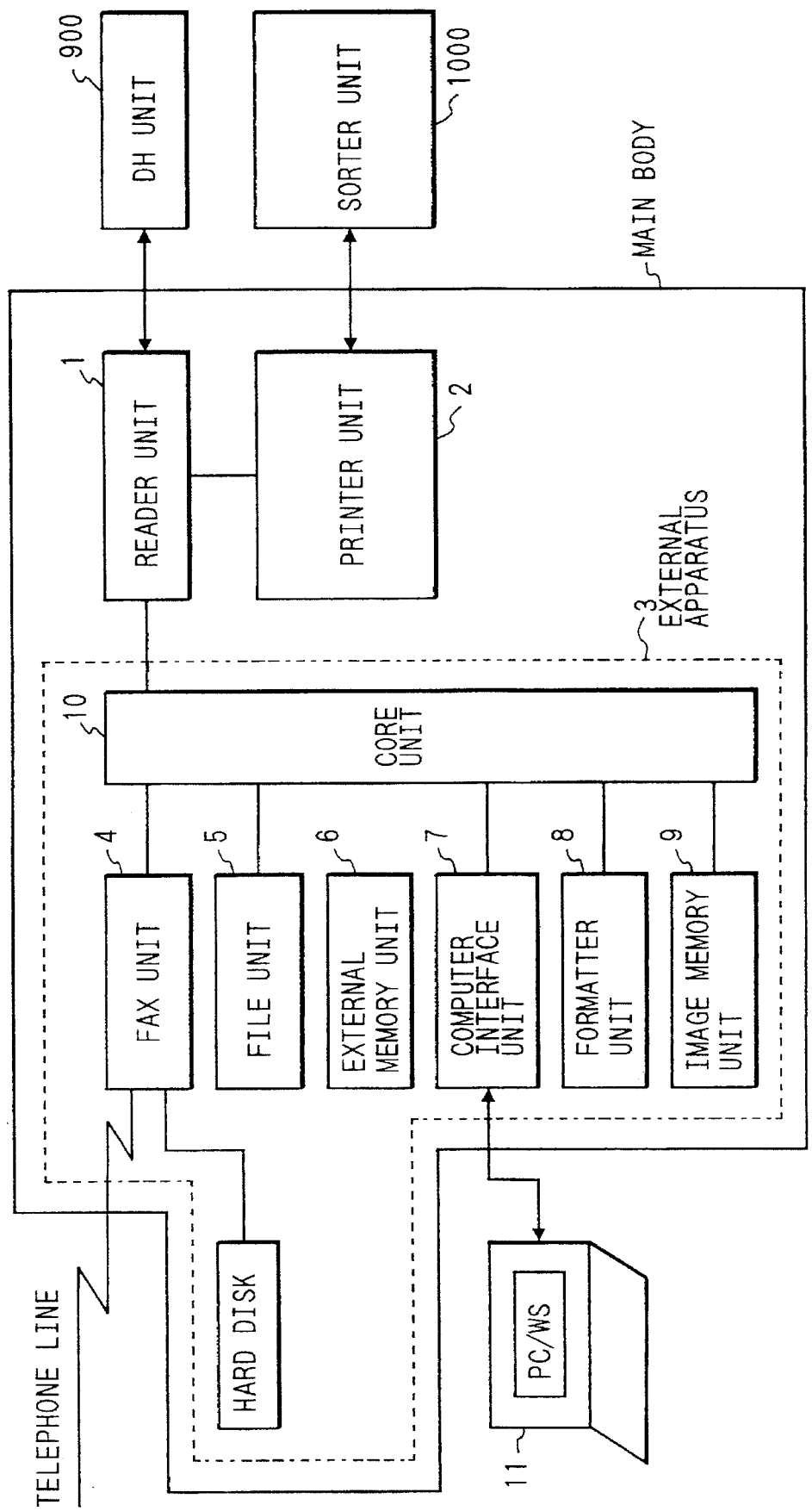
FIG. 6 is an overall configurational block diagram of a system.

FIG. 6 is a block diagram showing the configuration of an overall system, wherein 1 is a reader unit, 2 is a printer unit, 3 is an external apparatus, 900 is a control unit of an original transport unit (DH unit), and 1000 is a control unit of a sorter unit, wherein data is received or transmitted via a bus or through the serial communication synchronously. Herein, data which the DH unit 900 sends from the main body includes a paper supply signal for promoting the supply of an original laid on the DH unit 900, a paper eject signal for promoting the ejection of the original on the platen glass 102 (FIG. 1), and a paper supply and ejection mode for determining the form of the paper supply and ejection of original, and data to be sent from the main body 100 to the sorter unit 1000 includes an image formation mode, a storage mode into the sorter 100, a stored sheet size, and a timing signal. During the operation, data indicating which function of the external apparatus 3 is used for the operation is transmitted through the communication from the reader unit 1, or the printer unit 2, to the DH unit 900 or the sorter unit 100.

Also, the external apparatus 3 is connected with the reader unit 1 via a cable, wherein the control of signals or the control for various functions is made by a core unit within the external apparatus 3. Within the external apparatus 3, a FAX unit 4 for FAX transmission and reception, a file unit 5 for saving electric signals converted from the information of various kinds of original in an erasable magnetooptical disk, a formatter unit 8 for expanding the code information from a computer 11 into image information, a computer interface unit 7 for making interface with the computer 11, an image memory unit 9 for storing information from the reader unit 1 and temporarily storing information sent from the computer 11, and a core unit 10 for controlling each of the above functions.

E. Reader Unit 1

Figure 7:
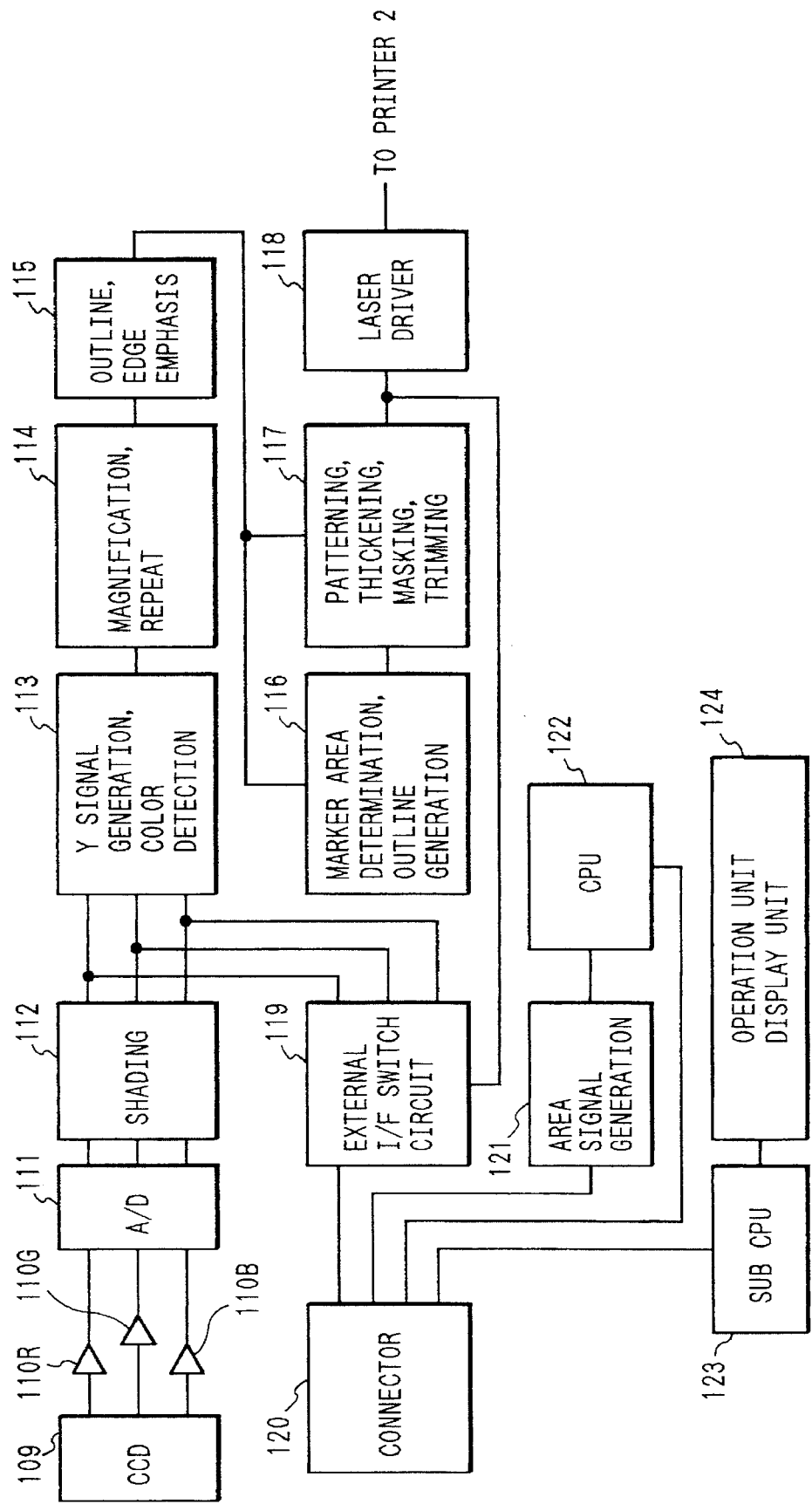
FIG. 7 is a configurational block diagram for the signal processing of a reader unit.

FIG. 7 is a circuit block diagram showing the signal processing configuration of the reader unit 1, of which the configuration and operation will be described below.

Reflected light from the original applied to the CCD 109 in FIG. 1 is photoelectrically converted into the electric signal of each color of red (R), green (G) and blue (B). Each color information from the CCD 109 is amplified at each of the amplifiers 110R, 110G, 110B that follow, in accordance with an input signal level of an A/D converter 111. An output signal from the A/D converter 111 is input into a shading circuit 112 to correct for the unevenness in light distribution of a lamp 103 or sensitivity of CCD 109. A signal from the shading circuit 112 is input into a Y signal generation/color detection circuit 113 and an external I/F switch circuit 119.

The Y signal generation/color detection circuit 113 arithmetically operates the signal from the shading circuit 112, according to the following expression:

$$Y = 0.3R + 0.6G + 0.1B$$

to obtain a Y signal.

Further, a color detection circuit for separating the signal of R, G and B into seven colors, and outputting a signal corresponding to each color is provided. An output signal from the Y signal generation and color detection circuit 113 is input into a magnification repeat circuit 114. The magnification in a sub-scan direction is effected by the scanning rate of a scanner unit 104 in FIG. 1, while the magnification in a main scan direction is effected by a magnification circuit and a repeat circuit 114. Also, a plurality of identical images can be output by the magnification and repeat circuit 114. An outline and edge emphasis circuit 115 provides the edge emphasis and outline information by emphasizing the high frequency component of the signal from the magnification and repeat circuit 114. The signal from the outline and edge emphasis circuit 115 is input into a marker area determination and outline generation circuit 116 and a patterning, thickening, masking and trimming circuit 117.

The marker area determination and outline generation circuit 116 reads a portion on the original written by a marker pen of designated color and generates outline information of a marker, and the next patterning, thickening, masking and trimming circuit 117 performs the thickening, masking and trimming for this outline information. Also, patterning is effected upon a color detection signal from the Y signal generation and color detection circuit 113.

The signal from the patterning, thickening, masking and trimming circuit 117 is input into a laser driver circuit 118 for converting various kinds of processed signals into a signal for driving a laser. An output signal from the laser driver 118 is input into the printer 2 to make image formation as a visible image.

Next, an external I/F switch circuit 119 for making I/F with the external apparatus will be described.

The external I/F switch circuit 119 outputs image information from the patterning, thickening, masking and trimming circuit 117 to a connector 120, when the image information from the reader unit 1 is output to the external apparatus 3. Also, when the image information from the external apparatus 3 is input into the reader unit 1, the external switch circuit 119 inputs image information from the connector 120 into the Y signal generation and color detection circuit 113.

The above-mentioned image information is processed upon an instruction from the CPU 122, and an area signal generation circuit 121 generates various kinds of timing signals necessary for the above image processing, based on a value set by the CPU 122. Further, a communication function contained within the CPU 122 makes it possible to make communication with the external apparatus 3. A SUB CPU 123 makes control of an operation unit 124, and communication with the external apparatus 3 using a communication function contained in the CPU 123.

F. Core Unit 10

Figure 8:
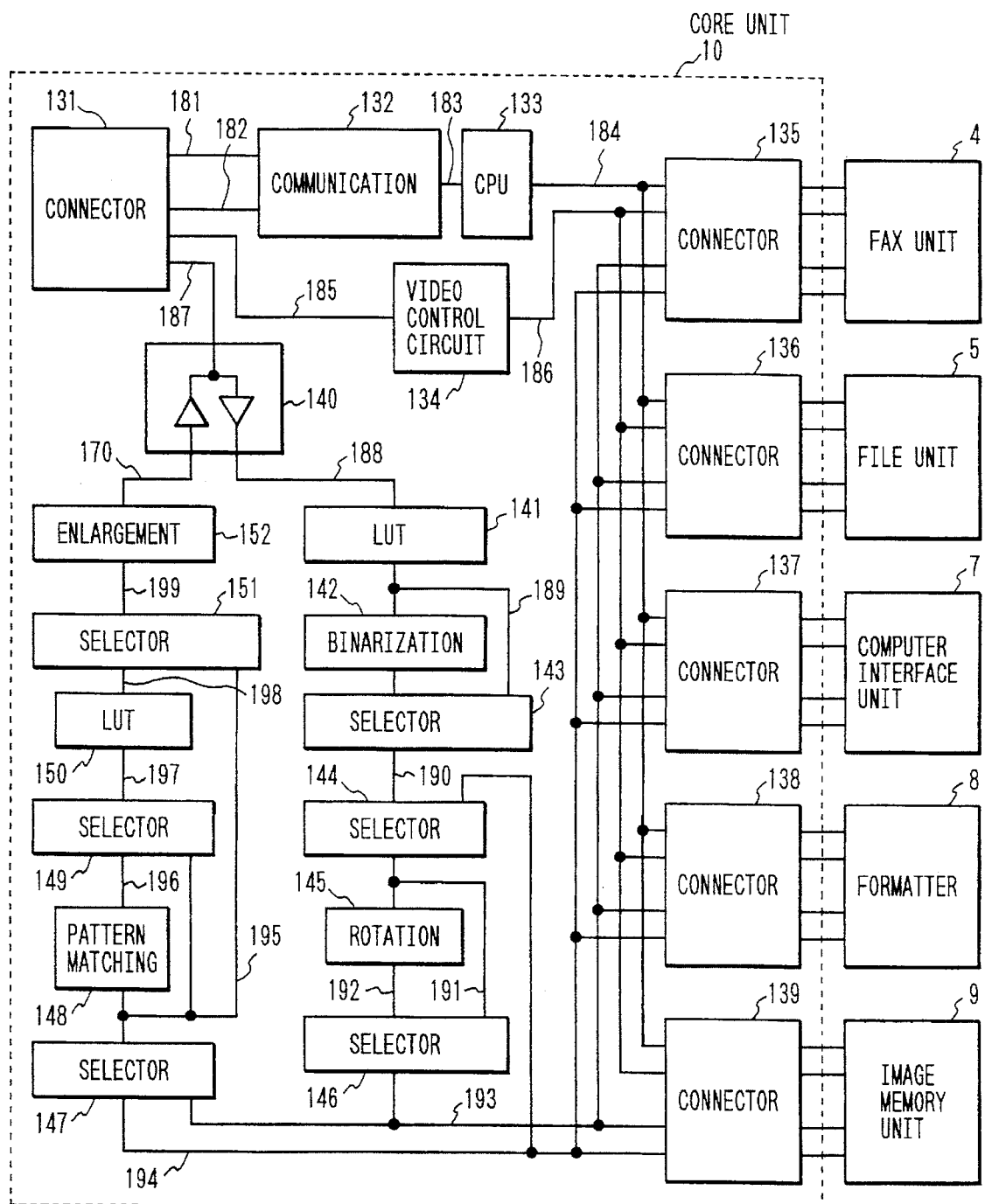
FIG. 8 is a configurational block diagram of a core unit.

FIG. 8 is a block diagram showing the detail configuration of a core unit 10 as shown in FIG. 6. A connector 131 of the core unit 10 is connected via a cable of a connector 120 of the reader unit 1 as shown in FIG. 6. The connector 131 contains four kinds of signals, in which a signal 187 is 8-bit multi-value video signal. A signal 185 is a control signal for controlling the video signal. A signal 181 is for the communication with the SPU 122 (FIG. 3) within the reader unit 1. A signal 182 is for the communication with the SUB CPU 123 (FIG. 7) within the reader unit 1. The signals 181 and 182 are processed in accordance with communication protocol by a communication IC 132, from which communication information is sent via a CPU bus 183 to the CPU 133.

The signal 187 is on a bidirectional video signal line, through which information from the reader unit 1 can be received by the core unit 10, and information from the core unit 10 can be outputted to the reader unit 1.

The signal 187 is led to a buffer 140 for the separation of a bidirectional signal into unidirectional signals 188 and 170. A signal 188 is 8-bit multi-value video signal from the reader unit 1, and is inputted into an LUT 141 at the next stage. In the LUT 141, image information from the reader unit 1 is converted into desired values using a look-up table. An output signal 189 from the LUT 141 is input into a binarization circuit 142 or a selector 143. The binarization circuit 142 has a simple binarization function of binarizing the multi-value signal 189 at a fixed slice level, a binarization function at variable slice level where the slice level varies with the value of pixel around the noticed pixel, and an error diffusion binarization function. Binarized information is converted into multi-value signal which is equal to 00H for the value of 0, and FFH for the value of 1, which signal is input into a selector 143 at the next stage.

The selector 143 selects a signal from the LUT 141 or an output signal from the binarization circuit 142. The output signal 190 from the selector 143 is input into a selector 144. The selector 144 selects, upon an instruction of the CPU 133, a signal 194 which is obtained by inputting an output video signal from the FAX unit 4, the file unit 5, the computer interface unit 7, the formatter unit 8, the image memory unit 9 as shown in FIG. 7, via respective connectors 135, 136, 137, 138, and 139 into the core unit 10, or an output signal 190 from the selector 143. The output signal from the selector 144 is input into a rotation circuit 145 or a selector 146. The rotation circuit 145 has a function of rotating the input image signal by +90, −90 or +180 degrees. The rotation circuit 145 stores information output from the reader unit 1 converted into binary signal by the binarization circuit 142, as information from the reader unit 1.

Subsequently, upon an instruction from the CPU 33, the rotation circuit 145 reads stored information by rotating it. The selector 146 selects either an output signal from the rotation circuit 145 or an input signal 191 of the rotation circuit 145 to output a signal 193 to a connector 135 for the FAX unit 4, a connector 136 for the file unit 5, a connector 137b for the computer interface unit 7, a connector for the formatter unit 8, a connector 139 for the image memory unit and a selector 147.

The signal 193 is on a synchronous 8-bit unidirectional video bus for transferring image information from the core unit 10 to the FAX unit 4, the file unit 5, the computer interface unit 7, the formatter unit 8, and the image memory unit 9. The signal 194 is on the synchronous 8-bit unidirectional video bus of transferring image information from the FAX unit 4, the file unit 5, the computer interface unit 7, the formatter unit 8, and the image memory unit 9. It is a video control circuit 134 that controls the synchronous bus for the signals 193 and 194, based on an output signal 186 from a video control circuit 134. A signal 184 is further connected to each of the connectors 135 to 139. The signal 184 is on a bidirectional 16-bit CPU bus for transmitting or receiving data or command asynchronously. The transfer of information between the FAX unit 4, the file unit 5, the computer interface unit 7, the formatter unit 8, or the image memory unit 9 and the core unit 10 is allowed via two video buses 193, 194 and the CPU bus 184.

The signal 194 from the FAX unit 4, the file unit 5, the computer interface unit 7, the formatter unit 8, or the image memory unit 9 is input into the selectors 144 and 147. The selector 144 inputs the signal 194 into the rotation circuit 145 at the next stage, upon an instruction from the CPU 133. Also, the selector 147 selects either the signal 193 or the signal 194, upon an instruction from the CPU 133. The output signal from the selector 147 is inputted to a pattern matching 148 and a selector 149. The pattern matching 148 makes pattern matching of an input signal 195 with a predetermined pattern, wherein when the pattern is matched, a predefined multi-value signal is output to a signal line 196. When no pattern is matched, the input signal 195 is directly output as the signal 196.

The selector 149 selects either the signal 195 or the signal 196, upon an instruction of the CPU 133. The output signal 197 from the selector 149 is input into an LUT 150 at the next stage. The LUT 150 transforms the input signal 197 in accordance with the characteristics of the printer in outputting image information to the printer unit 2. A selector 151 selects either the output signal 198 of the LUT 150 or the signal 195, upon an instruction of the CPU 133. The output signal of the selector 151 is input into an enlargement circuit 152 at the next stage. The enlargement circuit 152 makes it possible to set the enlargement magnification independently in the X and Y directions, upon an instruction from the CPU 133. The enlargement method is a linear interpolation. The output signal 170 of the enlargement circuit 152 is input into a buffer 140. A signal input into the buffer 140 becomes a bidirectional signal 187, upon an instruction of the CPU 133, and is sent via a connector 131 to the printer unit 2 for the print-out.

The flow of signals between the core unit 10 and each unit will be described below.

(Operation of Core Unit 10 with Information of FAX Unit 4)

The outputting of information to the FAX unit 4 will be described by the following. In FIG. 8, the CPU 133 makes communication with the CPU 122 (FIG. 7) of the reader unit 1 via the communication IC 132 to issue an original scan instruction. The reader unit 1 outputs image information to the connector 120 (FIG. 7) as the scanner unit 104 (FIG. 1) scans the original upon this instruction. The reader unit 1 and the external apparatus 3 (FIG. 6) are connected via a cable, information from the reader unit 1 being input into the connector 131 of the core unit 10. Also, image information input into the connector 131 is input through multi-value 8-bit signal line 187 into the buffer 140. The buffer circuit 140 passes bidirectional signal 187 via the signal line 188 into the LUT 141, as an unidirectional signal, upon as instruction of the CPU 133.

The LUT 141 transforms image information from the reader unit 1 into desired values, using a look-up table. For example, it is possible to skip ground of the original. The output signal 189 from the LUT 141 is input into the binarization circuit 142 at the next stage. The binarization circuit 142 converts 8-bit multi-value signal 189 into binary signal. The binarization circuit 142 provides two multi-value signals: 00H when the binarized signal is 0, or FFH when it is 1. The output signal of the binarization circuit 142 is input via the selectors 143, 144 into the rotation circuit 145 or the selector 146. The output signal of the rotation circuit 145 is also input into the selector 146, which then selects either the signal 191 or the signal 192. The selection of signal is determined by the CPU 133 making communication with the FAX unit 4 via the CPU bus 184. The output signal 193 from the selector 146 is sent via the connector 135 to the FAX unit 4.

Next, the receiving of information from the FAX unit 4 will be described.

The image information from the FAX unit 4 is transmitted via the connector 135 to the signal line 194. The signal 194 is input into the selector 144 and the selector 147. When the image is rotated and outputs to the printer unit 3, upon an instruction of the CPU 133, the signal 194 input into the selector 144 is rotated by the rotation circuit 145. The output signal from the rotation circuit 145 is input via the selectors 146 and 147 into the pattern matching 148, when the received image is directly output to the printer, upon an instruction from the CPU 133, the signal 194 into the selector 147 is input into the pattern matching 148.

The pattern matching 148 has a function of smoothing the unevenness of the image received by FAX. The signal subjected to pattern matching is input via the selector 149 into the LUT 150. In order that the LUT 150 can output FAX received image at a desired density to the printer unit 2, the table of the LUT 150 is configured to be changed by the CPU 133. The output signal 198 of the LUT 150 is input via the selector 151 to the enlargement circuit 152. The enlargement circuit 152 enlarges an 8-bit multi-value having two values (00H, FFH) by linear interpolation method. The 8-bit multi-value signal having multi-value from the enlargement circuit 152 is sent via the buffer 140 and the connector 131 to the reader unit 1. This reader unit 1 passes this signal via the connector 120 of FIG. 7 into the external I/F switch circuit 119. The external I/F switch circuit 119 inputs the signal from the FAX unit 4 into the Y signal generation/color detection circuit 113. The output signal from the Y signal generation/color detection circuit 113 is subjected to various processings as described before, and output to the printer unit 2 for forming an image on the output paper.

Next, the outputting of information to the file unit 5 will be described.

(Operation of Core Unit 10 with Information of File Unit 5)

The CPU 133 makes communication with the CPU 122 of reader unit 1 via communication IC 132 to issue an original scan instruction. The reader unit 1 outputs image information to the connector 120 (FIG. 7) as the scanner unit 104 (FIG. 1) scans the original upon this instruction. The reader unit 1 and the external apparatus 3 are connected via a cable (FIG. 6), information from the reader unit 1 being input into the connector 131 of the core unit 10. The image information input into the connector 131 is transformed into a unidirectional signal 188 in the buffer 140. The signal 188 which is a multi-value 8-bit signal is converted into a desired signal by the LUT 141. The output signal 189 of the LUT 141 is input via the selector 143, the selector 144, and the selector 146 into the connector 136.

That is, the 8-bit multi-value is directly transferred to the file unit 5 without any use of the function of the binarization circuit 142 and the rotation circuit 145. When filing the binarized signal through the communication of the CPU 133 via the CPU bus 184, the functions of the binarization circuit 142 and the rotation circuit 145 are employed. The binarization process and the rotation process are identical to those of the FAX as above described, and is not described again.

Next, the receiving of information from the file unit 5 will be described.

The image information from the file unit 5 is input via the connector 136 into either the selector 144 or the selector 146, as the signal 194. When filing the 8-bit multi-value, image information can be input into the selector 147, or when filing the binary value, it can be input into the selector 144 or the selector 147. The filing of the binary value can be performed in the same way as the FAX, and any duplicate portion is not described herein.

In the filing of multi-value, the output signal 195 from the selector 147 is input via the selector 149 into the LUT 150. In the LUT 150, a look-up table is created, upon an instruction of the CPU 133, in accordance with the desired print density. The output signal 198 from the LUT 150 is input via the selector 151 into the enlargement circuit 152. The 8-bit multi-value signal 170 enlarged at a desired enlargement ratio by the enlargement circuit 152 is sent via the buffer 140 and the connector 131 to the reader unit 1. The information of the file unit sent to the reader unit 1 is output to the printer unit 2 in the same way as the FAX, for forming an image on the output paper.

(Operation of Core Unit 10 with Information of Computer Interface Unit 7)

The computer interface unit 7 makes interface with the computer connected to the external apparatus 3. The computer interface unit 7 has a plurality of interfaces for communication including SCSI, RS232C and Centronics interfaces. The computer interface unit 7 has the above-mentioned three types of interfaces, for passing information from each interface via the connector 137 and the data bus 184 to the CPU 133. The CPU 133 makes various controls from the contents sent thereto.

(Operation of Core Unit 10 with Information of Formatter Unit 8)

The formatter unit 8 has a function of expanding command data such as a document file sent from the computer interface unit 7 into image data. The CPU 133 transfers data via the connector 138 to the formatter unit 8, if the data sent from the computer interface unit 7 via the data bus 184 is judged data regarding the formatter unit 8. The formatter unit 8 expands transferred data into memory as a significant image such as the character or graphics.

Next, a procedure for receiving the information from the formatter unit 8 to form an image on the output paper will be described. The image information from the formatter unit 8 is transmitted via the connector 138 into the signal line 194 as the multi-value signal having two values (00H, FFH). The signal 194 is input into the selector 144 and the selector 147. By the instruction of the CPU 133, the selectors 144 and 147 are controlled. Because the subsequent procedure is the same as the FAX, as previously described, a duplicate portion is not described again.

The outputting of information to the image memory 9 will be described below.

(Operation of Core Unit 10 with Information of Image Memory Unit 9)

The CPU 133 makes communication with the CPU 122 of reader unit 1 (FIG. 7) via communication IC 132 to issue an original scan instruction. The reader unit 1 outputs image information to the connector 120 (FIG. 7) as the scanner unit 104 (FIG. 1) scans the original upon this instruction. The reader unit 1 and the external apparatus 3 are connected via a cable, information from the reader unit 1 being input into the connector 131 (FIG. 5) of the core unit 10. The image information input into the connector 131 is transmitted via the multi-value 8-bit signal line 187 and the buffer 140 to the LUT 141. The output signal 189 of the LUT 141 is sent via the selectors 143, 144, 146 and the connector 139 into the image memory 9, to transfer multi-value image information. The image information stored in the image memory unit 9 is sent via the CPU bus 184 of the connector 139 to the CPU 133. The CPU 133 transfers data sent from the image memory unit 9 to the computer interface unit 7. The computer interface unit 7 allows the use of a desired interface among the above-mentioned three interfaces (SCSI, RS232C, Centronics) for communication with the computer.

Next, the receiving of information from the image memory unit 9 will be described.

First, image information is sent from the computer to the core unit 10 via the computer interface unit 7. The CPU 133 of the core unit 10 transfers data via the connector 139 to the image memory unit 9 if the data sent via the CPU bus 184 from the computer interface unit 7 is judged data regarding the image memory unit 9. Then, the image memory unit 9 transmits an 8-bit multi-value signal 194 via the connector 139 to the selector 144 and the selector 147. The output signal from the selector 144 or selector 147 is output to the printer unit 2, in the same way as the FAX, as previously described, upon an instruction of the CPU 133, for forming an image on the output paper.

G. RDF Control Unit 900

Figure 9B:
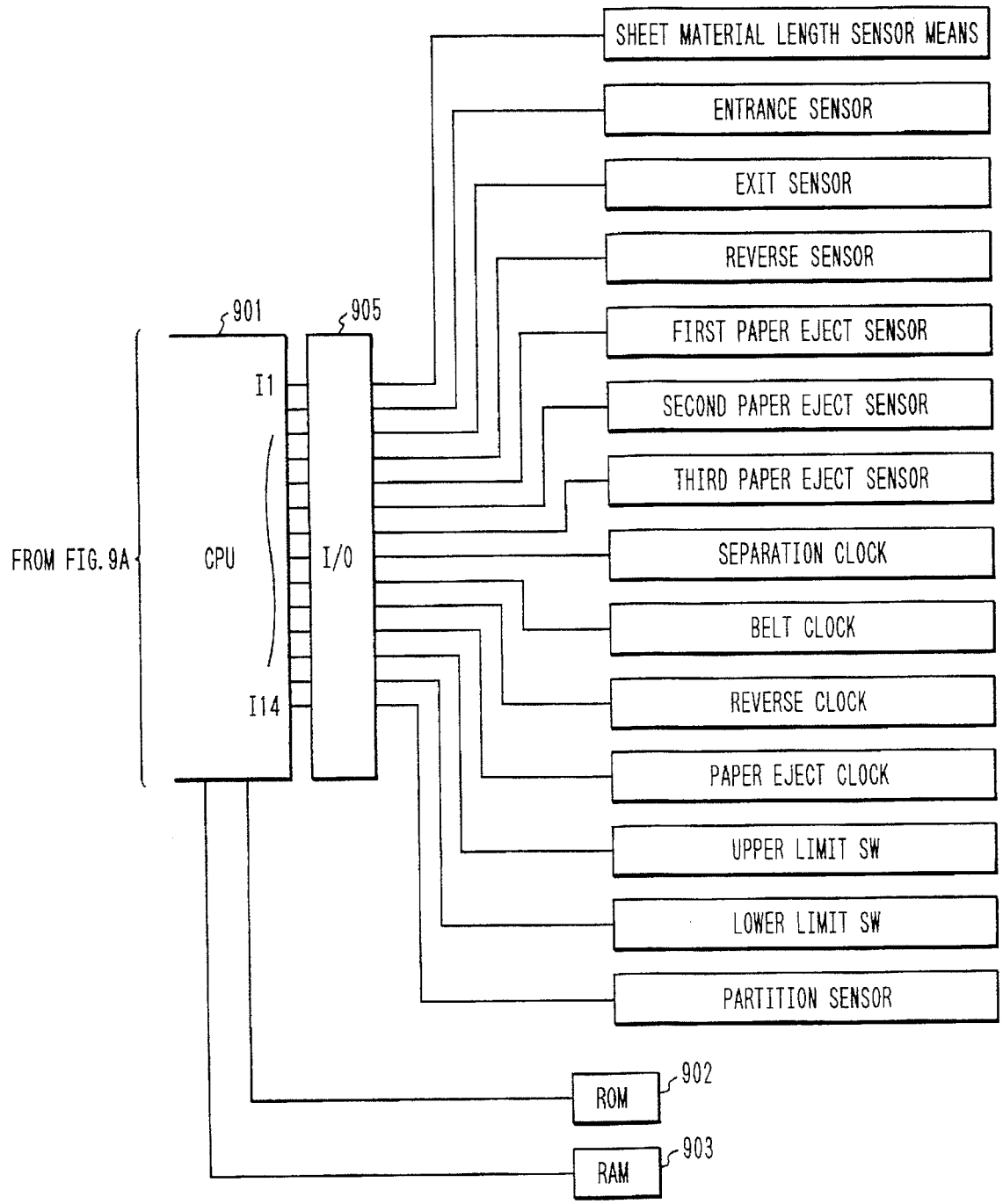
FIG. 9 which is comprised of FIGS. 9A and 9B is a configurational circuit block diagram of a sorter control unit.

FIGS. 9A and 9B are block diagrams showing the circuit configuration of a control unit 900 for a cyclic original automatic transport device (RDF) in this example, comprising a control unit 900 composed of a central processing unit (CPU) 901, a read-only memory (ROM) 902, a random access memory (RAM) 903, an output port 904, and an input port 905, with a control program stored in a ROM 902, and input data or working data stored in a RAM 903. Also, at the output port 904, various kinds of motors including a separation motor as described before, and solenoid driving means are connected, and at the input port 905, a paper supply sensor is connected, wherein the CPU 901 controls each unit connected via the bus in accordance with the control program stored in the ROM 902. Also, the CPU 901 has a serial interface function, for effecting the serial communication with the CPU of reader unit to transfer control data to or from the reader unit 1. The data sent from RDH 300 to the reader unit 1 includes a paper supply completion signal indicating the completion of supplying the original onto the platen glass plane 102 (FIG. 1).

H. Sorter Control Unit 1000

Figure 10:
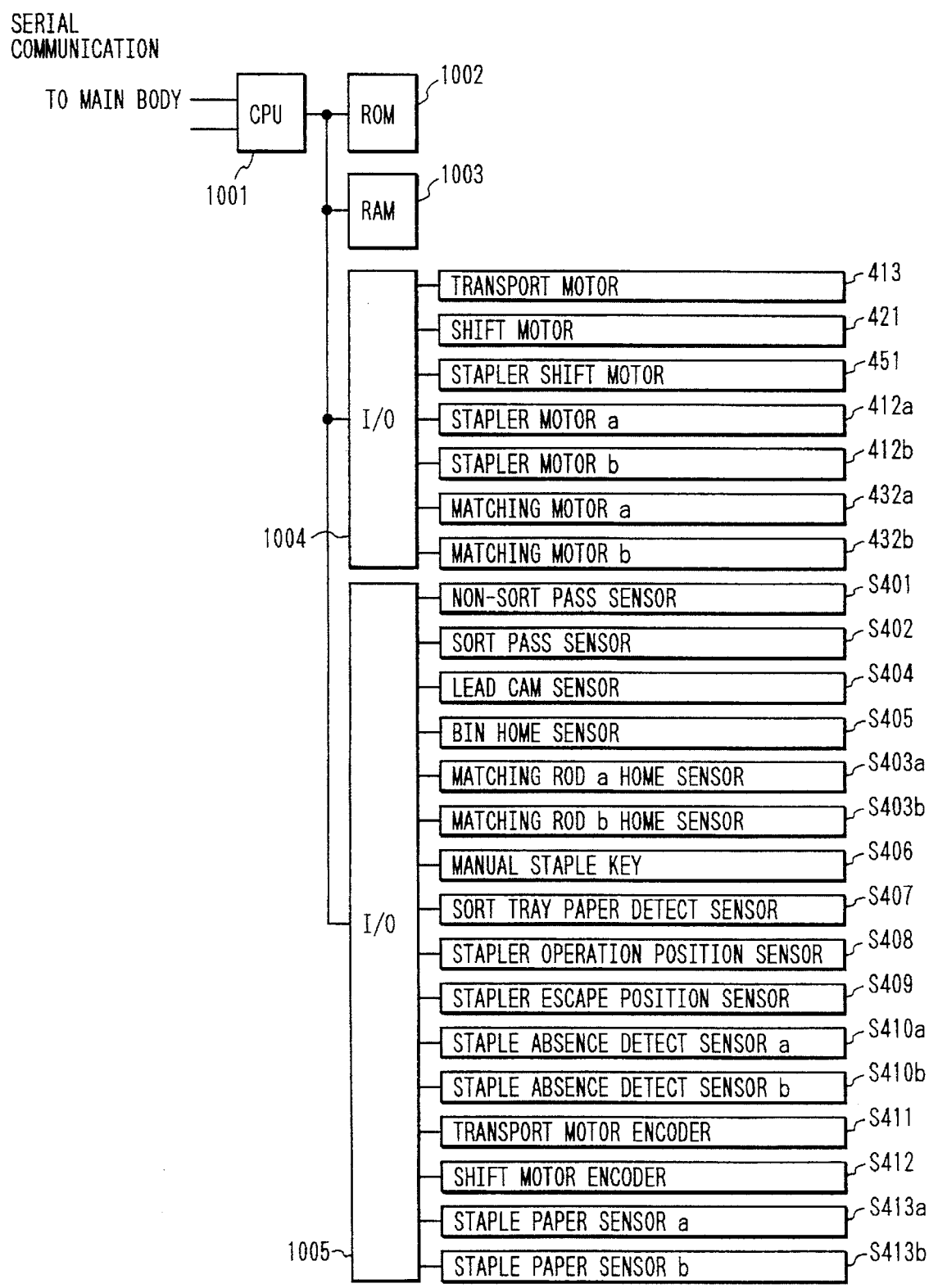
FIG. 10 is a configurational circuit block diagram of the sorter control unit.

FIG. 10 is a block diagram showing the circuit configuration of a control unit 1000 for a sheet post-processing device (sorter) 400 (FIG. 1) in this example, comprising a control unit 1000 composed of a central processing unit (CPU) 1001, a read-only memory (ROM) 1002, a random access memory (RAM) 1003, an output port 1004, and an input port 1005, with a control program stored in a ROM 1002, and input data or working data stored in a RAM 1003. Also, at the output port 1004, various kinds of motors including a shift motor 416 as described before are connected, and at the input port 1005, sensors and a switch S401 to S406, such as a non-sort path sensor S401, are connected, wherein the CPU 1001 controls each unit connected thereto via the bus by the control program stored in the RAM 1002. Also, the CPU 1001 has a serial interface function, for effecting the serial communication with the CPU of printer unit to control each unit based on the signal from the printer unit 200 (FIG. 1).

Figure 11:
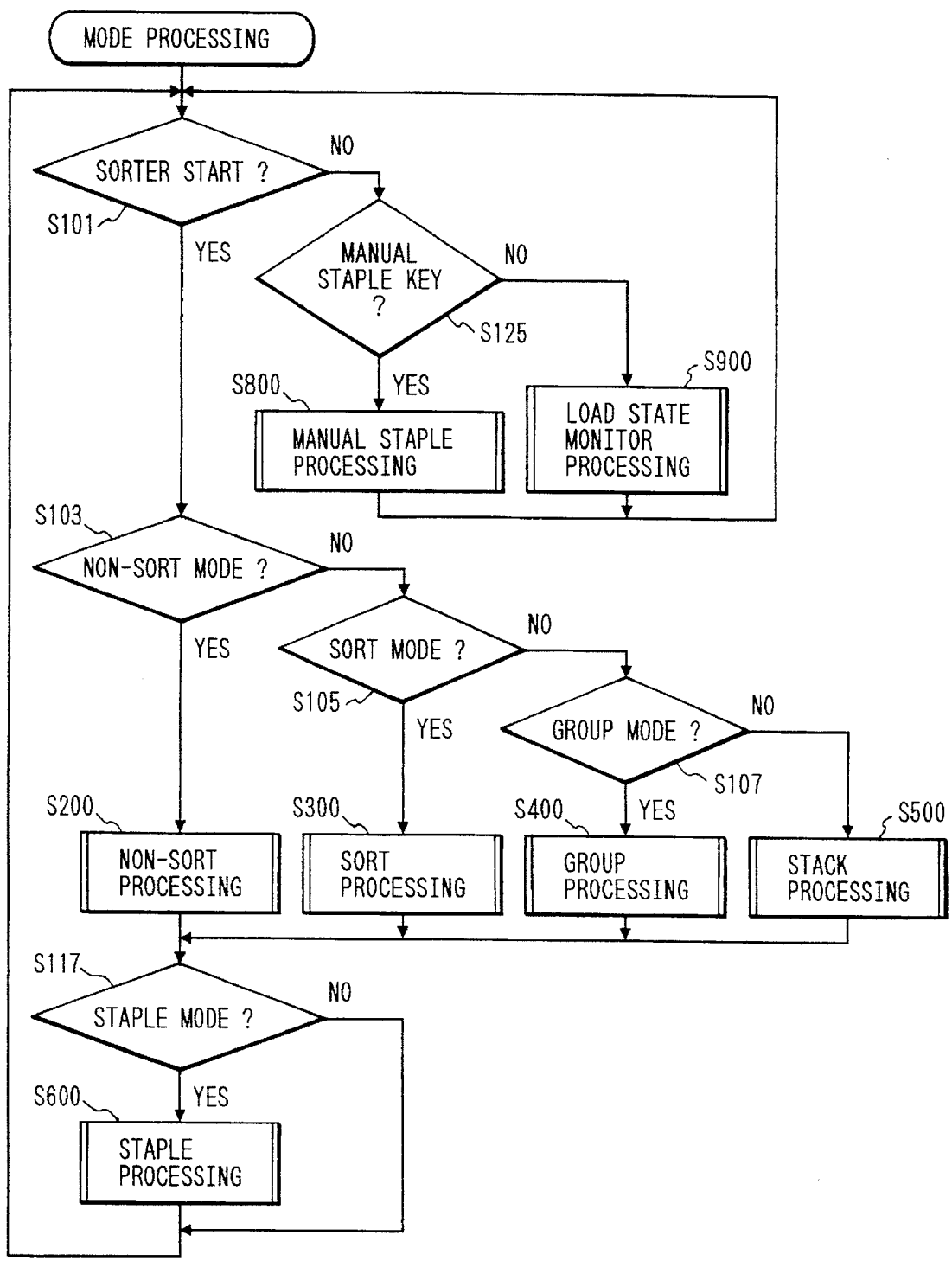
FIG. 11 is a control sequence flowchart (sort mode processing).
Figure 12:
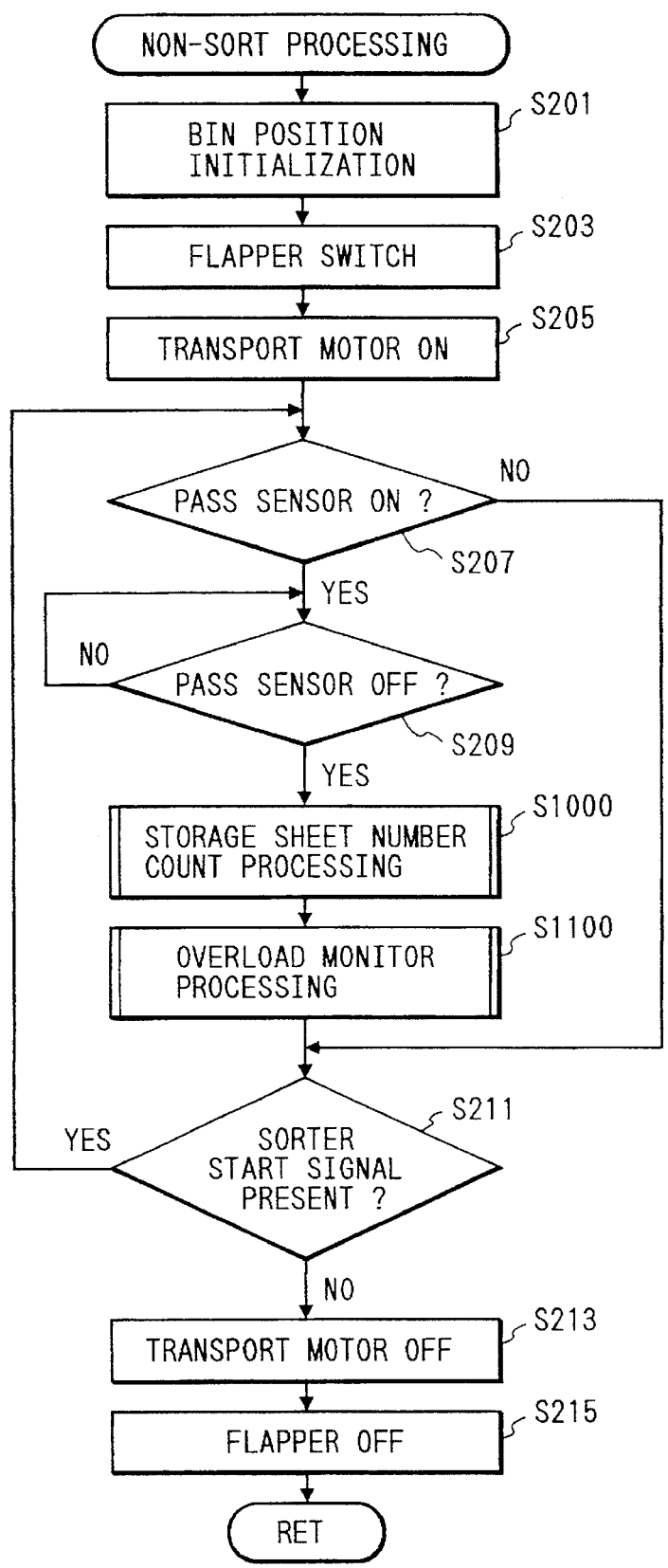
FIG. 12 is a control sequence flowchart of the sorter (non-sort mode processing).

Next, a control procedure sequence of the sorter 400 in this example will be described using each flowchart of FIGS. 11 and 12. Note that this example is not involved in the operation of the reader unit, the printer unit, the external apparatus, and the original transport unit, and the detail control method is not described.

(a) Sort Mode Processing

First, a sort mode processing which is a total processing of this example will be described in FIG. 11. At step S101, a "sorter start signal" indicating that the sheet ejection from the copying machine main body has been started is judged, and if present, the operation goes to step S103. If the "sorter start signal" is not present at step S101, a manual staple key is checked at step S125, and if the manual staple key is on, a manual staple processing (step S800, hereinafter described) is performed, while if it is off, a load state monitor processing is performed at step S900 (hereinafter described), after which the operation returns to step S101.

At steps S103 to S107, the mode regarding storage of the sheet ejected from the copying machine is determined for effecting respective processings that follow, as will be described later. That is, the operation passes through a non-sort processing (step S103, step S200) in a non-sort mode, a sort processing (step S105, S300) in a sort mode, a group processing (step S107, step S400) in a group mode, or a stack processing (step S107, S400) in other modes. After the above respective processing, a staple processing (step S600) is performed when in a staple mode (step S117), and then the operation returns to step S101.

(b) Non-sort Mode Operation

Next, the non-sort mode operation as above mentioned will be described in FIG. 12. First, as the initialization of bin for storing the sheet in the uppermost bin, the bin unit is moved down to a non-sort home position (step S201). A flapper 409 is switched to select the transport path 406 (see FIG. 3) as the sheet transport path within the sorter (step S203). This flapper 409 is provided with a driving solenoid not shown for switching this flapper, which is situated at a normal position of selecting the transport path 407 when in the off state, or at a position of selecting the transport path 406 upon turning on.

After step S203, the transport motor for transporting the sheet is turned on at step S205. The bus sensor on/off is checked (step S207, step S209), and the operation proceeds to a storage sheet number count processing (hereinafter described) at step S1000. That is, the number of sheets stored through the transport path into the bin is counted. Thereafter, an overload monitor processing is performed (step S1100, hereinafter described) and a "sorter start signal" is judged (step S211). And if the "sorter start signal" is on, the operation returns to step S207, while if it is off, the transport motor is stopped at step S213, the flapper is turned off at step S215, and the non-sort processing is ended.

(c) Sort Mode Operation

Figure 13B:
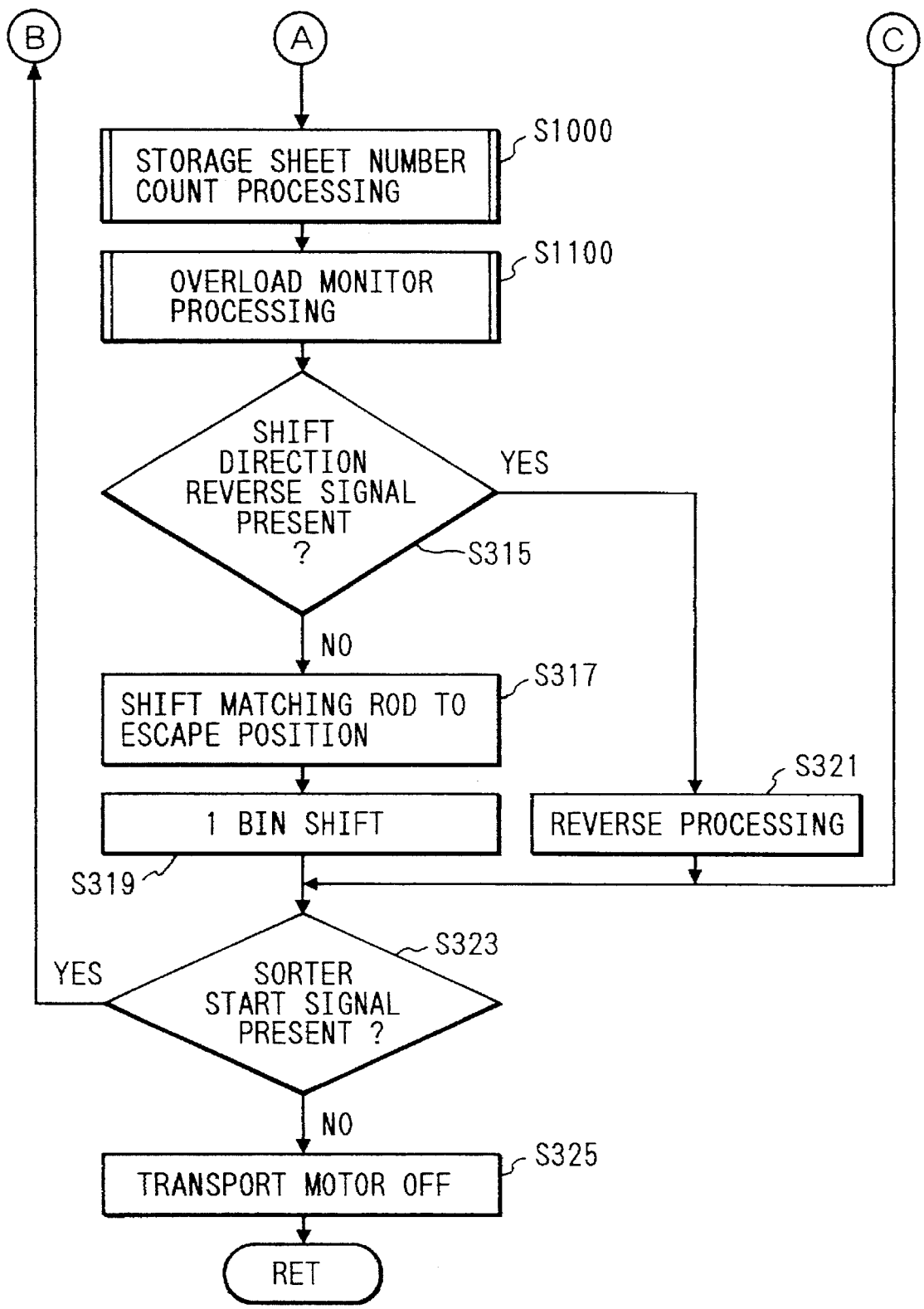
FIG. 13 which is comprised of FIGS. 13A and 13B is a control sequence flowchart of the sorter (sort mode operation).

Next, the sort mode operation will be described in FIGS. 13A and 13B. First, the designation of storage start bin position is judged (step S327), and if designated, the shift to the storage start bin position occurs (step S329). If not designated, a "bin initial signal" for storing the sheet in the uppermost bin is judged (step S301). If the "bin initial signal" is absent, the operation goes to step S305, or otherwise to step S303. At step S303, as the initialization of the bin, the bin unit is moved down to the non-sort home position. At step S305, the transport motor is turned on, and the bus sensor is checked (step S307). If the bus sensor is not on at step S307, the operation proceeds to step S323, or otherwise, at step S309, the matching rod is shifted to escape position to subsequently perform matching operation for ejected sheets.

Thereafter, if the bus sensor is detected off, the matching operation for stored sheets is performed (step S313), the storage sheet number count processing is performed (step S1000), and the overload monitor processing is performed (step S1100). At step S315, the presence of a shift direction reverse signal is detected. If not present, the matching rod is shifted to escape position (step S317), and the one bin shift occurs (step S319), or if present, the reverse processing is performed (step S321). Herein, the reverse processing is a process of reversing the bin shift direction that subsequently occurs, wherein any bin operation is not performed. If at step S323, a "sorter start signal" is on, the operation returns to step S307, or if the "sorter start signal" is off, the transport motor is stopped at step S325, whereby the sort processing is ended.

(d) Group Mode Operation

Figure 14B:
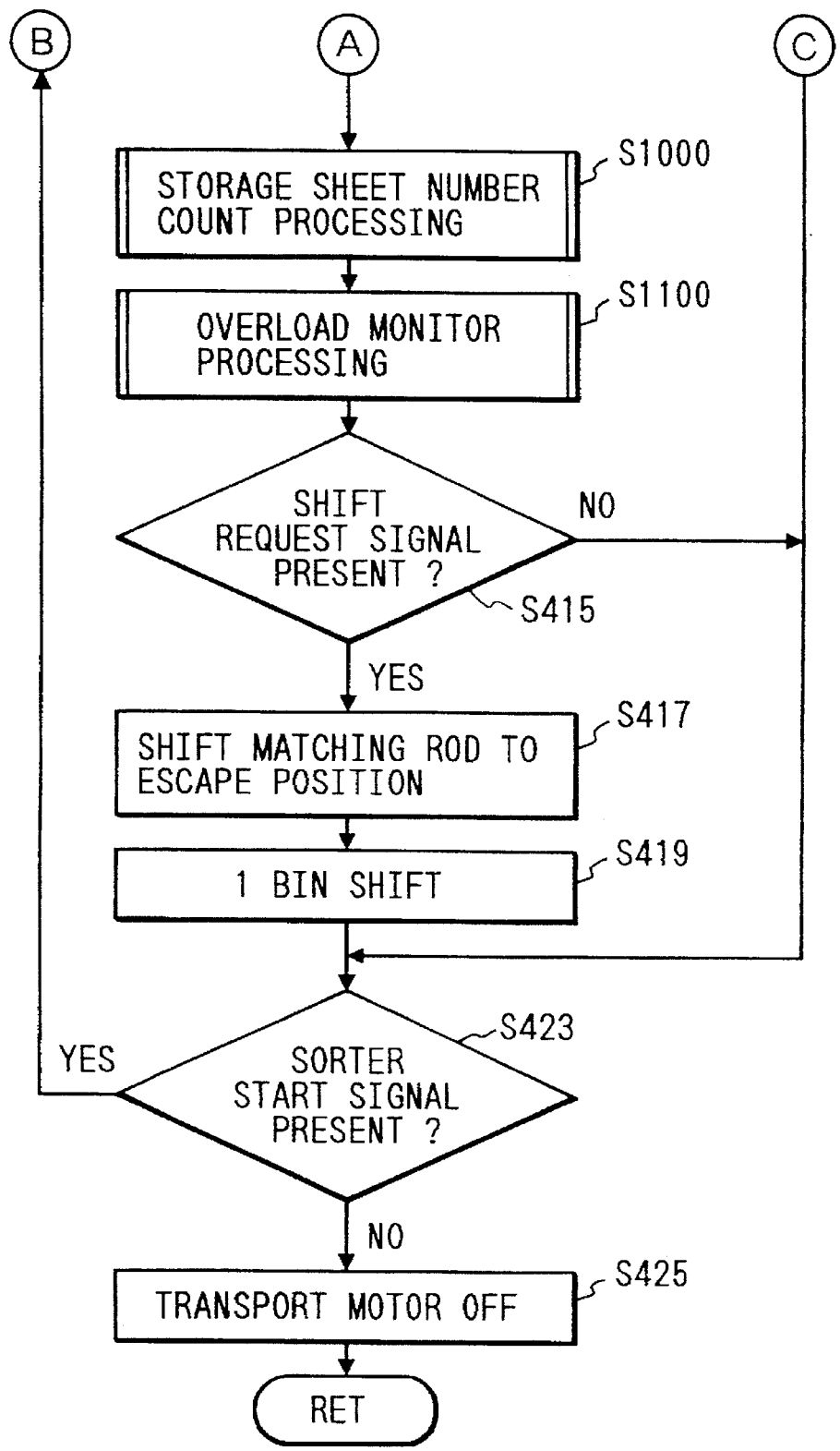
FIG. 14 which is comprised of FIGS. 14A and 14B is a control sequence flowchart of the sorter (group mode operation).

Next, the group mode operation will be described in FIGS. 14A and 14B. First, the designation of storage start bin position is judged (step S427), and if designated, the shift to the storage start bin position occurs (step S429). If not designated, a "bin initial signal" for storing the sheet in the uppermost bin is detected (step S401). If the "bin initial signal" is absent, the operation goes to step S405, or otherwise to step S403. At step S403, as the initialization of bin, the bin unit is moved down to the non-sort home position. At step S405, the transport motor is turned on, and the bus sensor is checked (step S407). If the bus sensor is not on at step S407, the operation proceeds to step S423, or otherwise, at step S409, the matching rod is shifted to escape position to subsequently perform matching operation for ejected sheets.

Thereafter, if the bus sensor is detected off, the matching operation for stored sheets is performed (step S413), the storage sheet number count processing is performed (step S1000), and the overload monitor processing is performed (step S1100). At step S415, the presence of a bin shift request signal is judged. If present, the matching rod is shifted to escape position (step S417), and the one bin shift occurs (step S419), or if not present, the operation proceeds to step S423. And if at step S423, a "sorter start signal" is on, the operation returns to step S407, or if the "sorter start signal" is off, the transport motor is stopped at step S425, whereby the sort processing is ended.

(e) Stack Mode Operation

Figure 15B:
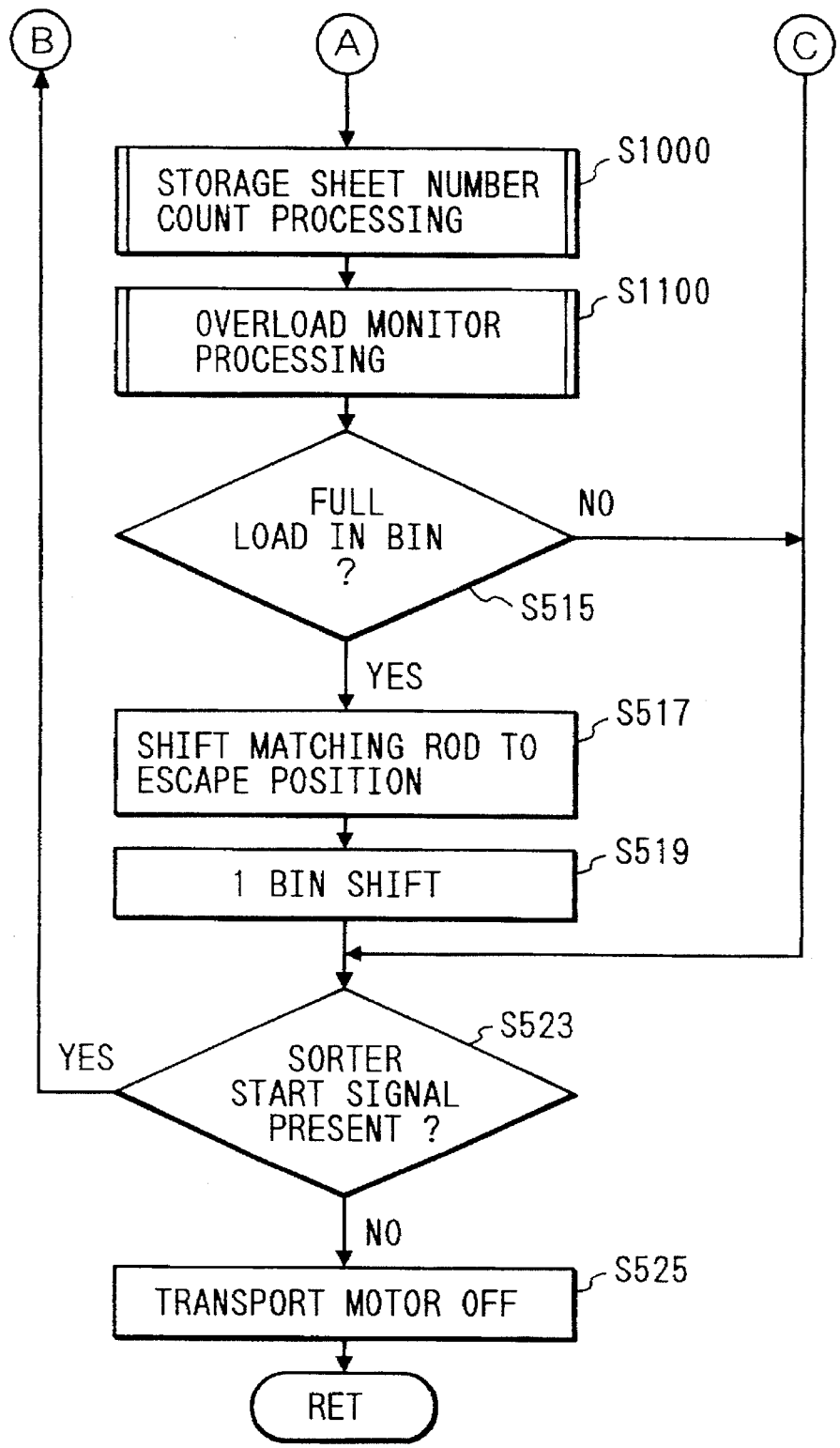
FIG. 15 which is comprised of FIGS. 15A and 15B is a control sequence flowchart of the sorter (stack mode operation).

Next, the stack mode operation will be described in FIGS. 15A and 15B. First, the designation of storage start bin position is judged (step S527), and if designated, the shift to the storage start bin position occurs (step S529). If not designated, a "bin initial signal" for storing the sheet in the uppermost bin is detected (step S501). If the "bin initial signal" is absent, the operation goes to step S505, or otherwise to step S503. At step S503, as the initialization of bin, the bin unit is moved down to the non-sort home position. At step S505, the transport motor is turned on, and the bus sensor is checked (step S507). If the bus sensor is not on at step S507, the operation proceeds to step S523, or otherwise, at step S509, the matching rod is shifted to escape position to subsequently perform matching operation for ejected sheets.

Thereafter, if the bus sensor is detected off (step S511), the matching operation for stored sheets is performed (step S513), the storage sheet number count processing is performed (step S1000), and the overload monitor processing is performed (step S1100). If the bin storage sheet number does not reach the upper limit sheet number at step S515, the operation proceeds to step S523, or otherwise, the matching rod is shifted to escape position (step S517), and the one bin shift occurs (step S519). If at step S523, a "sorter start signal" is on, the operation returns to step S507, or if the "sorter start signal" is off, the transport motor is stopped at step S525, whereby the stack processing is ended.

(f) Staple Processing

Figure 16:
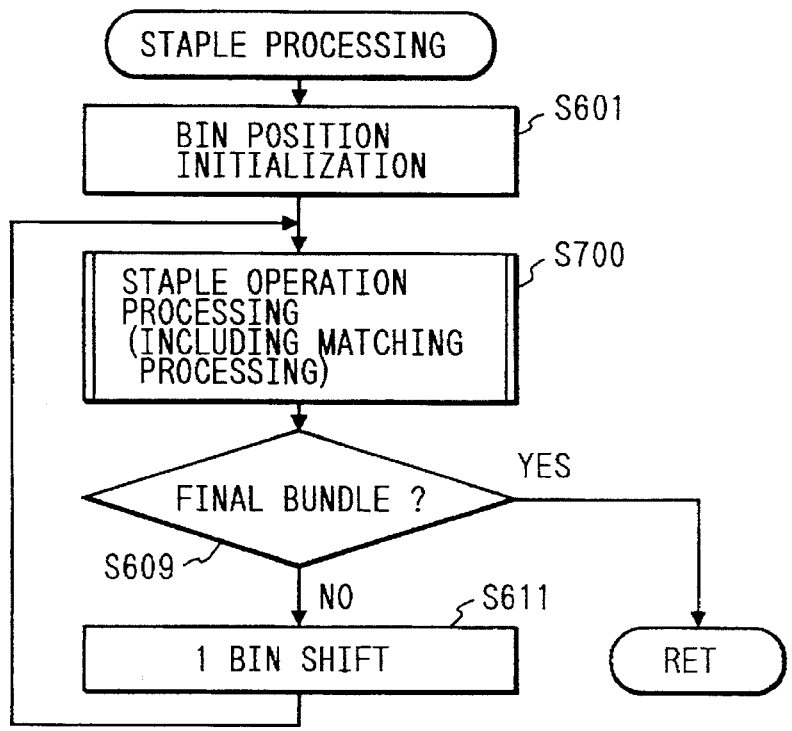
FIG. 16 is a control sequence flowchart of the sorter (staple processing).

Next, a staple processing will be described in FIG. 16. FIG. 16 is a flowchart showing a staple processing procedure sequence. First, at step S601, the bin position is initialized for a series of staple processings. The bin position to be initialized is the uppermost or lowermost position of the bins in use. If the bin position has been initialized, the shift direction is set downward for the upper position, or upward for the lower position. Then the operation proceeds to step S700 to perform a staple operation processing. The details of the staple operation processing at step S700 will be described later. After completion of the staple operation processing, the program proceeds to step S609 to determine whether or not the stapled bundle is a final bundle in a sequence of staplings. If it is the final bundle, the staple processing is ended, but if it is not the final bundle, the one bin shift occurs and the operation returns to step S700 to continue the processing.

Figure 17:
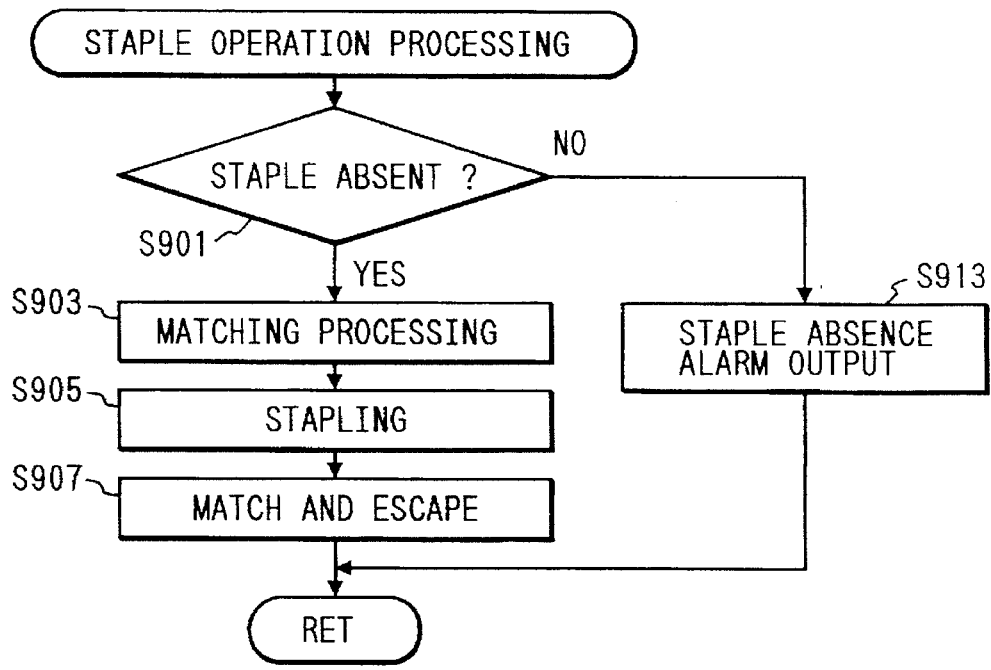
FIG. 17 is a control sequence flowchart of the sorter (staple operation).

The details of the sequence of staple operation processing will be described using a flowchart of FIG. 17. First, at step S901, a check is made to see whether or not any staple is present in the stapler. If any staple is present, the program proceeds to step S903 to hold the bundle with a matching rod not to cause displacement of the bundle. Then, at step S905, stapling is made, and at step S907, the matching rod is escaped, whereby the staple processing at one site is ended. If any staple is absent at step S901, the program proceeds to step S913, where a staple absence alarm is output to the main body, and the processing is ended.

(g) Manual Staple Operation

Figure 18:
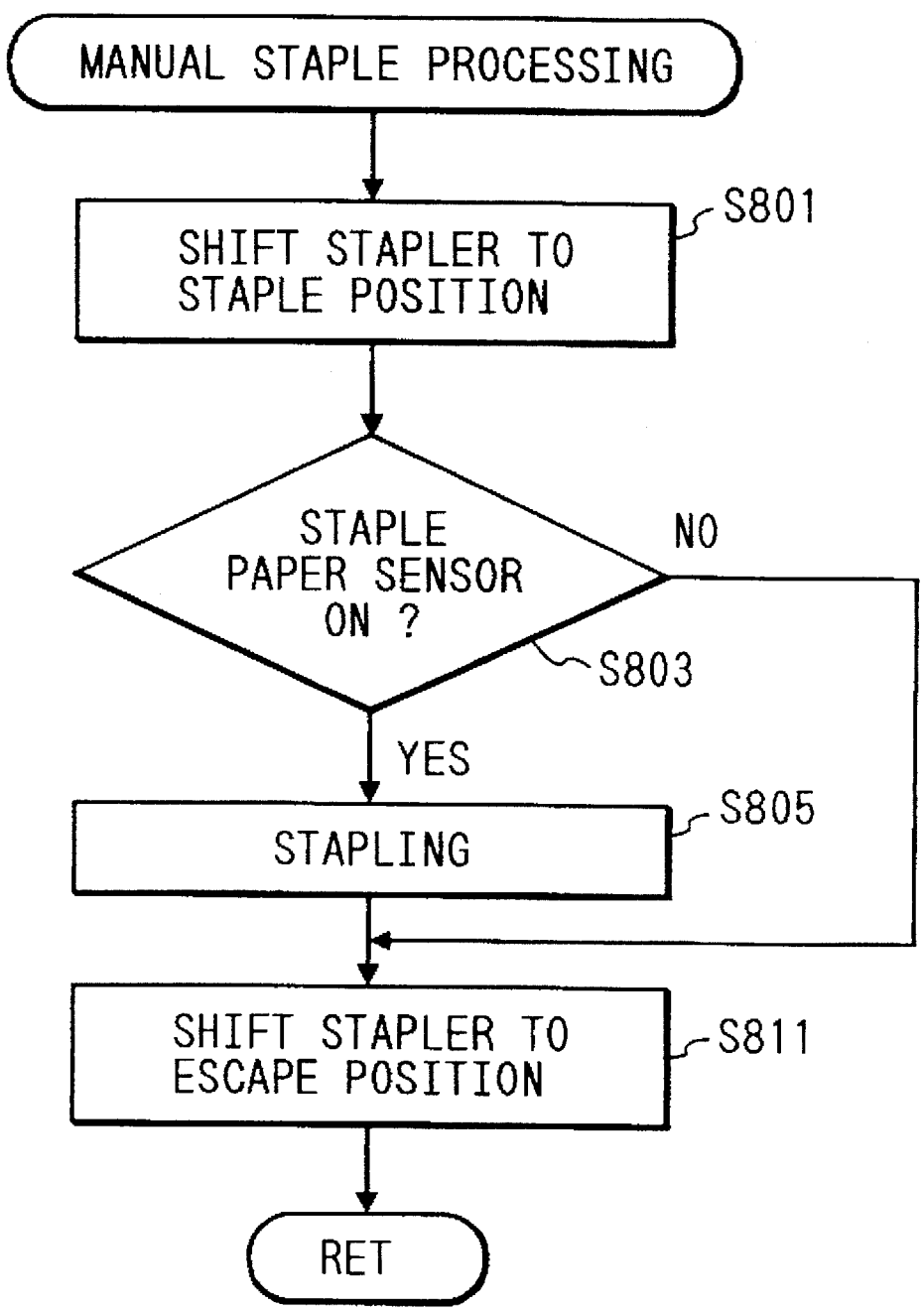
FIG. 18 is a control sequence flowchart of the sorter (manual staple operation).

Next, a manual staple operation will be described using FIG. 18. The manual staple is a mode of stapling the already loaded paper bundle on the bin or the paper bundle which the user inserts into the bin, effecting stapling of only one bin. First, at step S801, the stapler is shifted to the staple position. If the movement is ended, the presence of the paper on a portion of stapler is judged by means of a staple paper sensor a located near the stapler (step S803). If the paper is present, the program proceeds to step S805 to effect stapling with stapler a. At step S803, if any paper on the portion of stapler a is absent, or after stapling with stapler a is ended at step S805, the program proceeds to step S811. And the stapler is shifted to escape position, and the processing is ended.

(h) Load State Monitor Processing

Figure 19:
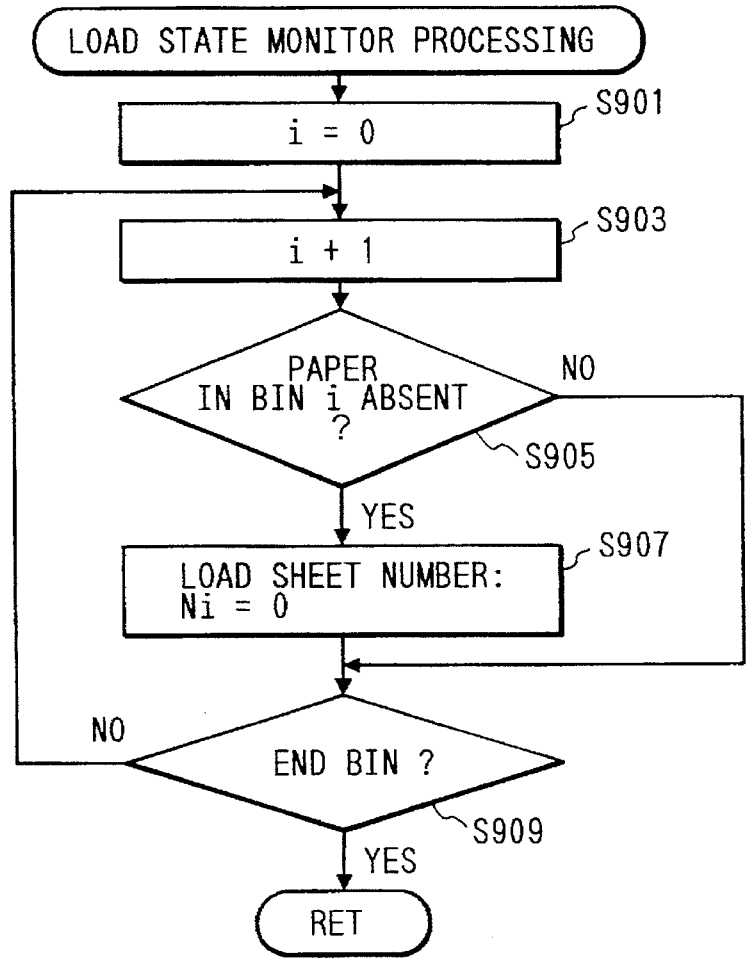
FIG. 19 is a control sequence flowchart of the sorter (load state monitor processing).

Next, a load state monitor processing will be described using FIG. 19. First, counter i on the program is cleared (step S901). At step S903, its counter is incremented by one. And a sheet detection sensor wihtin the i-th bin from the uppermost bin is checked (step S905), and if paper is not absent, the operation proceeds to step S909, while if paper is absent, the load sheet number counter Ni set for every bin is cleared to 0 (step S907). Thereafter, the same processing is performed for all the bins (step S903 to step S909), and after processing of the final bin (step S909), the processing is completed.

(i) Storage Sheet Number Count Processing

Figure 20:
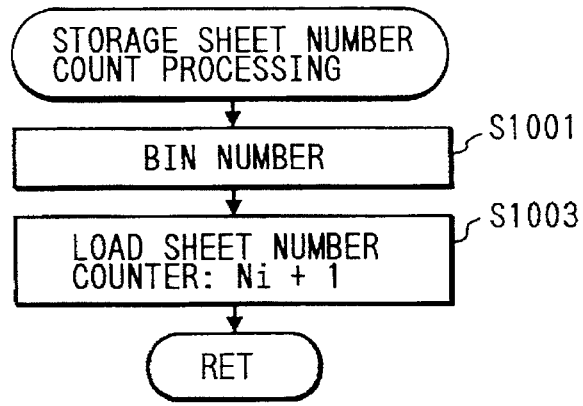
FIG. 20 is a control sequence flowchart of the sorter (storage sheet number count processing).

Next, a storage sheet number count processing will be described using FIG. 20. At step S1001, counter Ni on the program is set to bin number into which the sheet is ejected, and at step S1003, the load sheet number counter corresponding to i is incremented by one, whereby the processing is ended. For example, when the sheet is ejected into the first bin, N1 is incremented, or when the sheet is ejected into the fifth bin, N5 is incremented.

(j) Overload Monitor Processing

Figure 21:
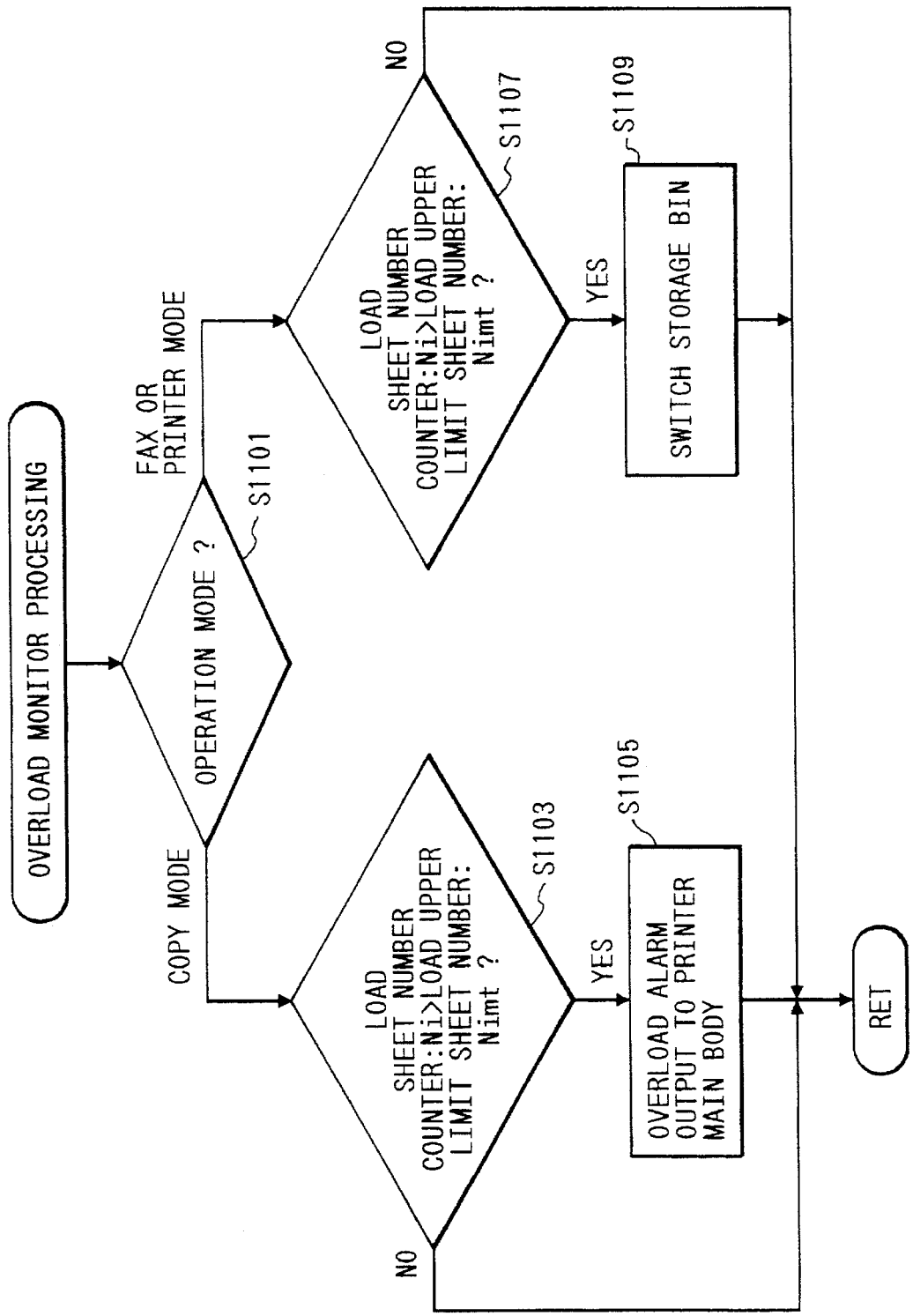
FIG. 21 is a control sequence flowchart of the sorter (overload monitor processing).

Next, an overload monitor processing will be described using FIG. 21. First, at step S1101, a determination is performed whether the operation mode for ejecting the sheet into the sorter 400 is a copy mode or others (FAX or printer), and if it is the copy mode, the operation goes to step S1103, or otherwise to step S1107. At step S1103, a check is made to see whether or not the load sheet number Ni currently stored in bin i is greater than the preset load upper limit sheet number Nlmt. If not greater than the load upper limit sheet number Nlmt, the processing is ended, or if greater than the load upper limit sheet number Nlmt, an overload alarm is output to the printer 200 (step S1105). This overload alarm is communication data for informing the printer that sheets beyond the set number have been loaded in the sorter. The printer 200 having accepted the overload alarm immediately stops the supply of sheets for image formation, and interrupts the image formation operation. The reader 100 issues an overload alarm to the operator. If the sheets are removed, the sorter 400 releases the alarm, and with this release of alarm, the printer 200 resumes the print operation.

Also, if it is determined at step S1101 that the operation mode is other than the copy mode, a check is made at step S1107 to see whether or not the load sheet number Ni currently stored in bin i is greater than the preset load upper limit sheet number Nlmt. And if not greater than the load upper limit sheet number Nlmt, the processing is ended, or if greater than the load upper limit sheet number Nlmt, the sheet storage bin for use is switched compulsorily within the sorter. This way, the overload processing is switched in accordance with the function (copy, FAX, printer). Note that the switching of storage bin at step S1109 occurs by investigating the bin having Ni=0, and storing the sheet in that bin. The sorter 400 sends the switched bin number data from the printer to the reader 100, which then displays its bin number on the LCD display 501.

[Example 2]

While in the described example 1 the sheet storage overload detection number was the same for the copy mode and other modes (FAX or printer), it can be understood that the overload detection sheet number may be changed for every function. This is because the sheet processing number per unit time may be often different between the copy and the FAX, for example, in which the sheet loading interval onto the bin may be varied to have different loadable sheet numbers.

Figure 22:
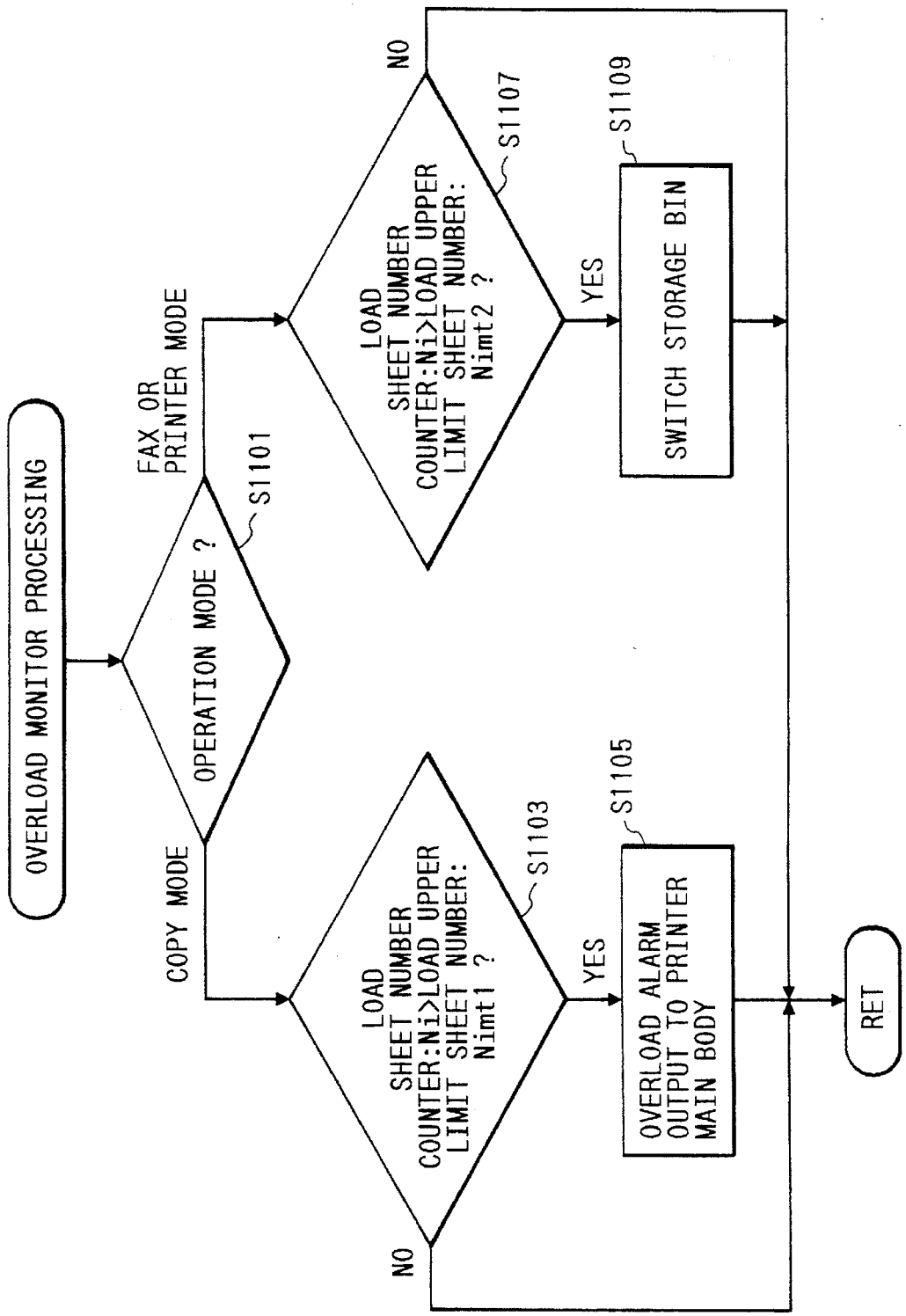
FIG. 22 is a control sequence flowchart of an example 2 (overload monitor processing).

The controls of the example 2 will be described using the figures. The contents from FIGS. 11 to 20 are the same as those of the previous example, and are not duplicately described any more. And an overload monitor processing is described with reference to FIG. 22. First, at step S1101, a determination is performed whether the operation mode for ejecting the sheet into the sorter is a copy mode or others (FAX or printer), and if it is the copy mode, the operation goes to step S1103, or otherwise to step S1107. At step S1103, a check is made to see whether or not the load sheet number currently stored in bin is greater than the preset load upper limit sheet number Nlmt1. If not greater than the load upper limit sheet number Nlmt1, the processing is ended, or if greater than the load upper limit sheet number Nlmt1, an overload alarm as previously noted is output to the printer 200 (step S1105). With this overload alarm, the printer 200 and the reader 100 perform the same controls as described previously.

Also, if it is determined at step S1101 that the operation mode is other than the copy mode, a check is made at step S1107 to see whether or not the load sheet number currently stored in bin is greater than the preset load upper limit sheet number Nlmt2. If not greater than the load upper limit sheet number Nlmt2, the processing is ended, or if greater than the load upper limit sheet number Nlmt2, the sheet storage bin in use is switched compulsorily within the sorter. This way, the maximum load can be realized at a speed of respective function by switching the overload detection sheet number Nlmt2 (copy, FAX, printer) in accordance with the function (copy, FAX, printer).

[Example 3]

The controls of this example 3 will be described using the figures. The contents from FIGS. 11 to 20 are the same as those of the previous example, and are not duplicately described any more.

Figure 23:
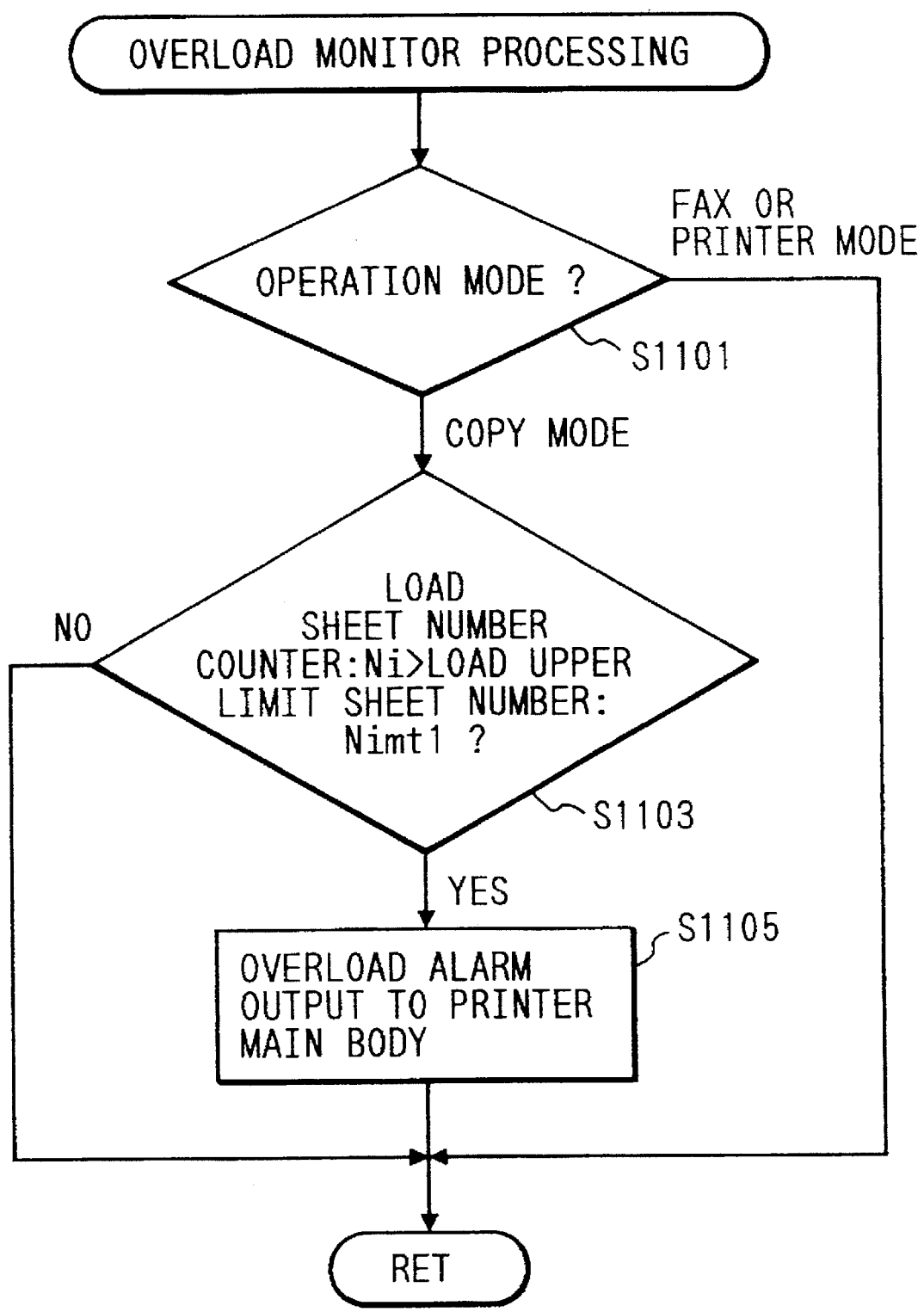
FIG. 23 is a control sequence flowchart of an example 3 (overload monitor processing).

An overload monitor processing is described with reference to FIG. 23. First, at step S1101, a determination is performed whether the operation mode for ejecting the sheet into the sorter 400 is a copy mode or others (FAX or printer), and if it is the copy mode, the operation goes to step S1103, or otherwise the processing is ended without conducting overload monitor. At step S1103, a check is made to see whether or not the load sheet number currently stored in bin is greater than the preset load upper limit sheet number Nlmt1. And if not greater than the load upper limit sheet number Nlmt1, the processing is ended, or if greater than the load upper limit sheet number Nlmt1, an overload alarm is output to the printer 200 (step S1105). With this overload alarm, the printer 200 and the reader 100 perform the same controls as described previously.

In this way, by switching the way of overload detection in accordance with the function (copy, FAX, printer), the excellent loadability can be realized in the copy mode by stopping operation upon overload, while the immediateness can be assured in the FAX mode by directly exhausting the sheet without saving data in memory within the main body.

As above described, it is possible to provide a sheet storage number, sheet ejecting method corresponding to the function in such a way as to perform a predetermined sheet storage overload processing in accordance with the function such as the copy or the FAX, wherein for example, in the copy operation mode, if the sheet storage limit number is exceeded, the image forming operation is stopped to prohibit new sheet ejection, preventing disorder in the loadability of the sheet, or in the facsimile or printer mode, if the sheet storage limit number is exceeded, the sheet storing location is changed to continue the operation without stopping reception or output of received data, so that the immediateness of the facsimile can not be lost. Also, the same effects can be obtained with the output of the printer.

What is claimed is:

1. An image forming apparatus comprising:
   image forming means for forming an image on a sheet in either a copy mode or a facsimile mode;
   storage means for storing the sheet having the image formed by said image forming means;
   count means for counting the number of sheets stored in said storage means; and
   control means for controlling the image forming operation by said image forming means so that in the copy mode, when the number of sheets counted by said count means exceeds the maximum loadable sheet number of said storage means, the image forming operation by said image forming means is interrupted, and that in the facsimile mode, irrespective of whether the number of sheets counted by said count means exceeds said maximum loadable sheet number, the image forming operation by said image forming means is continued.

2. An image forming apparatus according to claim 1, wherein said storage means is a bin of a sorter.

3. An image forming apparatus according to claim 2, wherein said sorter switches the bin for sheet storage when in the facsimile mode and if the number of sheets counted by said count means exceeds said maximum loadable sheet number.

4. An image forming apparatus according to claim 3, wherein said sorter has detection means for detecting the bin having no sheet stored, and said sorter selects the bin detected by said detection means in switching the bin.

5. An image forming apparatus according to claim 3, further comprising display means for displaying the information indicating the bin which said sorter has switched.

6. An image forming apparatus comprising:
   image forming means for forming an image on a sheet in either a copy mode or a print mode;
   storage means for storing the sheet having the image formed by said image forming means;
   count means for counting the number of sheets stored in said storage means; and
   control means for controlling the image forming operation by said image forming means so that in the copy mode, when the number of sheets counted by said count means exceeds the maximum loadable sheet number of said storage means, the image forming operation by said image informing means is interrupted, and that in the print mode, irrespective of whether the number of sheets counted by said count means exceeds said maximum loadable sheet number, the image forming operation by said image forming means is continued.

7. An image forming apparatus according to claim 6, wherein said storage means is a bin of a sorter.

8. An image forming apparatus according to claim 7, wherein said sorter switches the bin for sheet storage when in the printer mode and when the number of sheets counted by said count means exceeds said maximum loadable sheet number.

9. An image forming apparatus according to claim 8, wherein said sorter has detection means for detecting the bin having no sheet stored, and said sorter selects the bin detected by said detection means in switching the bin.

10. An image forming apparatus according to claim 8, further comprising display means for displaying the information indicating the bin which said sorter has switched.

11. An image forming apparatus having an operation unit comprising:

image forming means for forming an image on a sheet in either a first mode in which image formation is started as said operation unit is operated or a second mode in which image formation is started upon an instruction from an external apparatus;

storage means for storing the sheet having the image formed by said image forming means;

count means for counting the number of sheets stored in said storage means; and control means for controlling the image forming operation by said image forming means so that in said first mode, when the number of sheets counted by said count means exceeds the maximum loadable sheet number of said storage means, the image forming operation by said image forming means is interrupted, and that in said second mode, irrespective of whether the number of sheets counted by said count means exceeds said maximum loadable sheet number, the image forming operation by said image forming means is continued.

12. An image forming apparatus according to claim 11, wherein said storage means is a bin of a sorter.

13. An image forming apparatus according to claim 12, wherein said sorter switches the bin for sheet storage when in the second mode and when the number of sheets counted by said count means exceeds said maximum loadable sheet number.

14. An image forming apparatus according to claim 13, wherein said sorter has detection means for detecting the bin having no sheet stored, and said sorter selects the bin detected by said detection means in switching the bin.

15. An image forming apparatus according to claim 13, further comprising display means for displaying the information indicating the bin which said sorter has switched.

16. An image forming method comprising:

forming an image on a sheet in either a copy mode or a facsimile mode;

storing the sheet having the image formed in storage means;

counting the number of sheets stored in said storage means; and controlling the image forming operation so that in the copy mode, when the number of sheets counted exceeds the maximum loadable sheet number of said storage means, the image forming operation is interrupted, and that in the facsimile mode, irrespective of whether the number of sheets counted exceeds said maximum loadable sheet number, the image forming operation is continued.

17. An image forming method according to claim 16, wherein said storage means is a bin of a sorter.

18. An image forming method according to claim 17, further comprising switching the bin for sheet storage when in the facsimile mode and if the number of sheets counted by said count means exceeds said maximum loadable sheet number.

19. An image forming method according to claim 18, further comprising detecting the bin having no sheet stored, and selecting the bin detected by said detection means in switching the bin.

20. An image forming method according to claim 18, further comprising displaying the information indicating the bin switched.

21. An image forming method comprising:

forming an image on a sheet in either a copy mode or a print mode;

storing the sheet having the image formed in storage means;

counting the number of sheets stored in said storage means; and controlling the image forming operation so that in the copy mode, when the number of sheets counted exceeds the maximum loadable sheet number of said storage means, the image forming operation is interrupted, and that in the print mode, irrespective of whether or not the number of sheets counted exceeds said maximum loadable sheet number, the image forming operation is continued.

22. An image forming method according to claim 21, wherein said storage means is a bin of a sorter.

23. An image forming method according to claim 22, further comprising switching the bin for sheet storage when in the printer mode and when the number of sheets counted by said count means exceeds said maximum loadable sheet number.

24. An image forming method according to claim 23, further comprising detecting the bin having no sheet stored, and selecting the bin detected in switching the bin.

25. An image forming method according to claim 23, further comprising displaying the information indicating the bin switched.

26. An image forming method comprising:

forming an image on a sheet in either a first mode in which image formation is started as an operation unit is operated or a second mode in which image formation is started upon an instruction from an external apparatus;

storing the sheet having the image formed in storage means;

counting the number of sheets stored in said storage means; and controlling the image forming operation so that in said first mode, when the number of sheets counted exceeds the maximum loadable sheet number of said storage means, the image forming operation is interrupted, and that in said second mode, irrespective of whether the number of sheets counted exceeds said maximum loadable sheet number, the image forming operation is continued.

27. An image forming method according to claim 26, wherein said storage means is a bin of a sorter.

28. An image forming method according to claim 27, further comprising switching the bin for sheet storage when in said second mode and when the number of sheets counted by said count means exceeds said maximum loadable sheet number.

29. An image forming method according to claim 28, further comprising detecting the bin having no sheet stored, and selecting the bin detected in switching the bin.

30. An image forming method according to claim 28, further comprising displaying the information indicating the bin switched.

31. An image forming apparatus comprising:
image forming means for forming an image on a sheet in either a copy mode or a facsimile mode;
storage means for storing the sheet having the image formed by said image forming means;
detection means for detecting an amount of the sheets stored in said storage means; and
control means for controlling an image forming operation by said image forming means so that in the copy mode, when the amount of the sheets detected by said detection means exceeds a maximum loadable sheet amount of said storage means, the image forming operation performed by said image forming means is interrupted, and that in the facsimile mode, irrespective of whether or not the amount of the sheets detected by said detection means exceeds said maximum loadable sheet amount, the image forming operation by said image forming means is continued.

32. An image forming apparatus according to claim 31, wherein said storage means comprises plural storage units, and the storage unit in which the sheet is to be stored is switched when the amount of said detected sheets exceeds the maximum loadable sheet amount.

33. An image forming apparatus comprising:
image forming means for forming an image on a sheet in either a copy mode or a print mode;
storage means for storing the sheet having the image formed by said image forming means;
detection means for detecting an amount of the sheets stored in said storage means; and
control means for controlling an image forming operation by said image forming means so that in the copy mode, when the amount of the sheets detected by said detection means exceeds a maximum loadable sheet amount of said storage means, the image forming operation performed by said image forming means is interrupted, and that in the print mode, irrespective of whether or not the amount of the sheets detected by said detection means exceeds said maximum loadable sheet amount, the image forming operation by said image forming means is continued.

34. An image forming apparatus according to claim 33, wherein said storage means comprises plural storage units, and the storage unit in which the sheet is to be stored is switched when the amount of said detected sheets exceeds the maximum loadable sheet amount.

35. An image forming apparatus having an operation unit comprising:
image forming means for forming an image on a sheet in either a first mode in which image formation is started as said operation unit is operated or a second mode in which image formation is started upon an instruction from an external apparatus;
storage means for storing the sheet having the image formed by said image forming means;
detection means for detecting an amount of sheets stored in said storage means; and
control means for controlling the image forming operation by said image forming means so that in said first mode, when the amount of the sheets detected by said detection means exceeds the maximum loadable sheet amount of said storage means, the image forming operation performed by said image forming means is interrupted, and that in said second mode, irrespective of whether or not the amount of the sheets detected by said detection means exceeds said maximum loadable sheet amount, the image forming operation by said image forming means is continued.

36. An image forming apparatus according to claim 35, wherein said storage means comprises plural storage units, and the storage unit in which the sheet is to be stored is switched when the amount of said detected sheets exceeds the maximum loadable sheet amount.

37. A method for forming an image comprising the steps of:
forming an image on a sheet in either a copy mode or a facsimile mode;
storing the sheet having the image formed by said image forming means;
detecting an amount of the sheets stored in said storage means; and
controlling an image forming operation by said image forming means so that in the copy mode, when the amount of the sheets detected by said detection means exceeds a maximum loadable sheet amount of said storage means, the image forming operation performed by said image forming means is interrupted, and that in the facsimile mode, irrespective of whether or not the amount of the sheets detected by said detection means exceeds said maximum loadable sheet amount, the image forming operation by said image forming means is continued.

38. A method for forming an image according to claim 37, wherein said storage means comprises plural storage units, further comprising the step of switching the storage unit in which the sheet is to be stored is switched when the amount of said detected sheets exceeds the maximum loadable sheet amount.

39. A method for forming an image comprising the steps of:
forming an image on a sheet in either a copy mode or a print mode;
storing the sheet having the image formed by said image forming means;
detecting an amount of the sheets stored in said storage means; and
controlling an image forming operation by said image forming means so that in the copy mode, when the amount of the sheets detected by said detection means exceeds a maximum loadable sheet amount of said storage means, the image forming operation performed by said image forming means is interrupted, and that in the print mode, irrespective of whether or not the amount of the sheets detected by said detection means exceeds said maximum loadable sheet amount, the image forming operation by said image forming means is continued.

40. A method for forming an image according to claim 39, wherein said storage means comprises plural storage units, further comprising the step of switching the storage unit in which the sheet is to be stored when the amount of said detected sheets exceeds the maximum loadable sheet amount.

41. A method for forming an image in an operation unit comprising:

forming an image on a sheet in either a first mode in which image formation is started as said operation unit is operated or a second mode in which image formation is started upon an instruction from an external apparatus;

storing the sheet having the image formed by said image forming means;

detecting an amount of sheets stored in said storage means; and controlling the image forming operation by said image forming means so that in said first mode, when the amount of the sheets detected by said detection means exceeds the maximum loadable sheet amount of said storage means, the image forming operation performed by said image forming means is interrupted, and that in said second mode, irrespective of whether or not the amount of the sheets detected by said detection means exceeds said maximum loadable sheet amount, the image forming operation by said image forming means is continued.

42. A method of forming an image in an operation unit according to claim 41, wherein said storage means comprises plural storage units, further comprising the step of switching the storage unit in which the sheet is to be stored when the amount of said detected sheets exceeds the maximum loadable sheet amount.

* * * * *

UNITED STATES PATENT AND TRADEMARK OFFICE
CERTIFICATE OF CORRECTION

PATENT NO. : 5,640,232
DATED : June 17, 1997
INVENTOR(S) : NORIFUMI MIYAKE, ET AL.

It is certified that error appears in the above-identified patent and that said Letters Patent is hereby corrected as shown below:

COLUMN 1:
    Line 26, "sheet" should read --sheets--; and
    Line 39, "occurs" should read --occurs,--.

COLUMN 5:
    Line 23, "rod" should read --rods--;
    Line 24, "rod" should read --rods--; and
    Line 29, "this" should read --these--.

COLUMN 9:
    Line 25, "CPU 33" should read --CPU 133--.

COLUMN 10:
    Line 34, "as" (second occurrence) should be deleted;
    Line 58, "outputs" should read --outputted--; and
    Line 63, "outputs" should read --outputted--.

COLUMN 17:
    Line 51, "the" should be deleted.

COLUMN 18:
    Line 1, ".And if" should read --.If--; and
    Line 7, "the" (second occurrence) should be deleted.

UNITED STATES PATENT AND TRADEMARK OFFICE
CERTIFICATE OF CORRECTION

PATENT NO. : 5,640,232

DATED : June 17, 1997

INVENTOR(S) : NORIFUMI MIYAKE, ET AL.

It is certified that error appears in the above-identified patent and that said Letters Patent is hereby corrected as shown below:

<u>COLUMN 22</u>:
 Line 39, "is to be" should read --to be--.

Signed and Sealed this

Twenty-fourth Day of February, 1998

Attest:

BRUCE LEHMAN

Attesting Officer    Commissioner of Patents and Trademarks